United States Patent [19]

Miyazawa et al.

[11] Patent Number: 5,559,645
[45] Date of Patent: Sep. 24, 1996

[54] DISK RECORDING APPARATUS WITH ADAPTIVE WINDOW ADJUSTING

[75] Inventors: Shyoichi Miyazawa; Ryutaro Horita, both of Yokohama; Kenichi Hase, Fujisawa; Satoshi Kawamura, Yokohama; Shinichi Kojima, Takasaki; Toshiyuki Iseki, Yokohama, all of Japan

[73] Assignee: Hitachi, Ltd., Tokyo, Japan

[21] Appl. No.: 216,606

[22] Filed: Mar. 23, 1994

Related U.S. Application Data

[62] Division of Ser. No. 964,294, Oct. 21, 1992, Pat. No. 5,402,274, which is a continuation of Ser. No. 734,073, Jul. 22, 1991, Pat. No. 5,187,615, which is a continuation of Ser. No. 329,552, Mar. 28, 1989, abandoned.

[30] Foreign Application Priority Data

| Mar. 30, 1988 | [JP] | Japan | 63-74326 |
| Apr. 27, 1988 | [JP] | Japan | 63-102511 |
| Jul. 22, 1988 | [JP] | Japan | 63-181892 |

[51] Int. Cl.[6] ........................... G11B 5/09
[52] U.S. Cl. ........................... 360/51; 360/53
[58] Field of Search .................. 360/46, 51, 53; 369/59

[56] References Cited

U.S. PATENT DOCUMENTS

| 4,678,940 | 7/1987 | Vasseghi et al. | 307/446 |
| 4,726,022 | 2/1988 | Chan et al. | 360/51 |
| 4,752,837 | 6/1988 | Deland, Jr. | 360/45 |
| 4,775,851 | 10/1988 | Burth | 341/155 |
| 4,809,088 | 2/1989 | Lufgren et al. | 360/51 |
| 4,829,545 | 5/1989 | Guzik et al. | 360/51 |
| 4,890,017 | 12/1989 | Masudor et al. | 307/570 |
| 4,894,734 | 1/1990 | Fischler et al. | 360/51 |
| 4,907,121 | 3/1990 | Hrassky | 361/154 |
| 4,908,722 | 3/1990 | Sonobe | 360/46 |
| 4,908,812 | 3/1990 | Aoshima et al. | 360/51 |
| 5,187,615 | 2/1993 | Miyazawa et al. | 360/46 |

OTHER PUBLICATIONS

"Microelectronics" Millman et al., pp. 320–321, 667, 687 2nd Ed. 1987 (1st Ed. 1979).

*Primary Examiner*—Aristotelis Psitos
*Assistant Examiner*—W. Chris Kim
*Attorney, Agent, or Firm*—Antonelli, Terry, Stout & Kraus

[57] ABSTRACT

In a signal processing unit for writing/reading data on/from a disk-shaped recording medium of a disk apparatus, all of a data separator, a code decoder circuit, a code encoder and a write compensation circuit are constructed on a one-chip integrated circuit. The data separator separates a synchronization clock from a code data reproduced from the disk. The code decoder circuit produces decoded data from the synchronization clock as the output from the data separator, and synchronized code data. The code encoder encodes data supplied from a host computer or a disk controller into code data. The write compensation circuit compensates for a peak shift with respect to write code data. This integrated circuit is fabricated by a Bipolar-CMOS process by which a bipolar transistor and a CMOS transistor are mixed with each other thereon.

5 Claims, 19 Drawing Sheets

| NRZ | 2-7 CODE |
|---|---|
| 1 0 | 0 1 0 0 |
| 1 1 | 1 0 0 0 |
| 0 0 0 | 0 0 0 1 0 0 |
| 0 1 0 | 1 0 0 1 0 0 |
| 0 1 1 | 0 0 1 0 0 0 |
| 0 0 1 0 | 0 0 1 0 0 1 0 0 |
| 0 0 1 1 | 0 0 0 0 1 0 0 0 |

FIG. 11
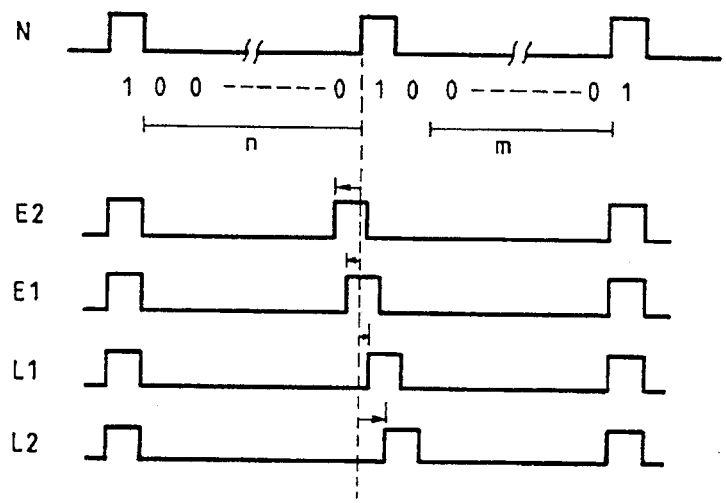
FIG. 12
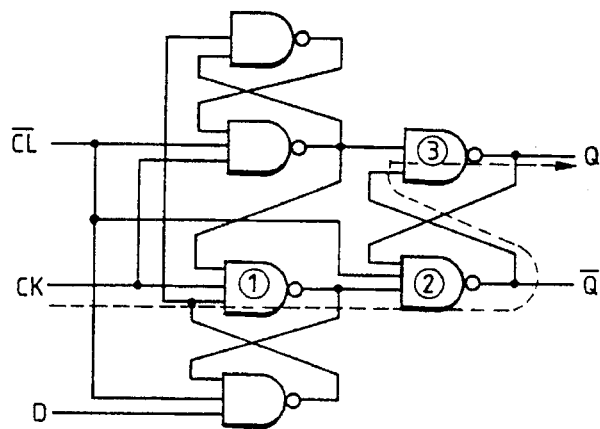
FIG. 13B

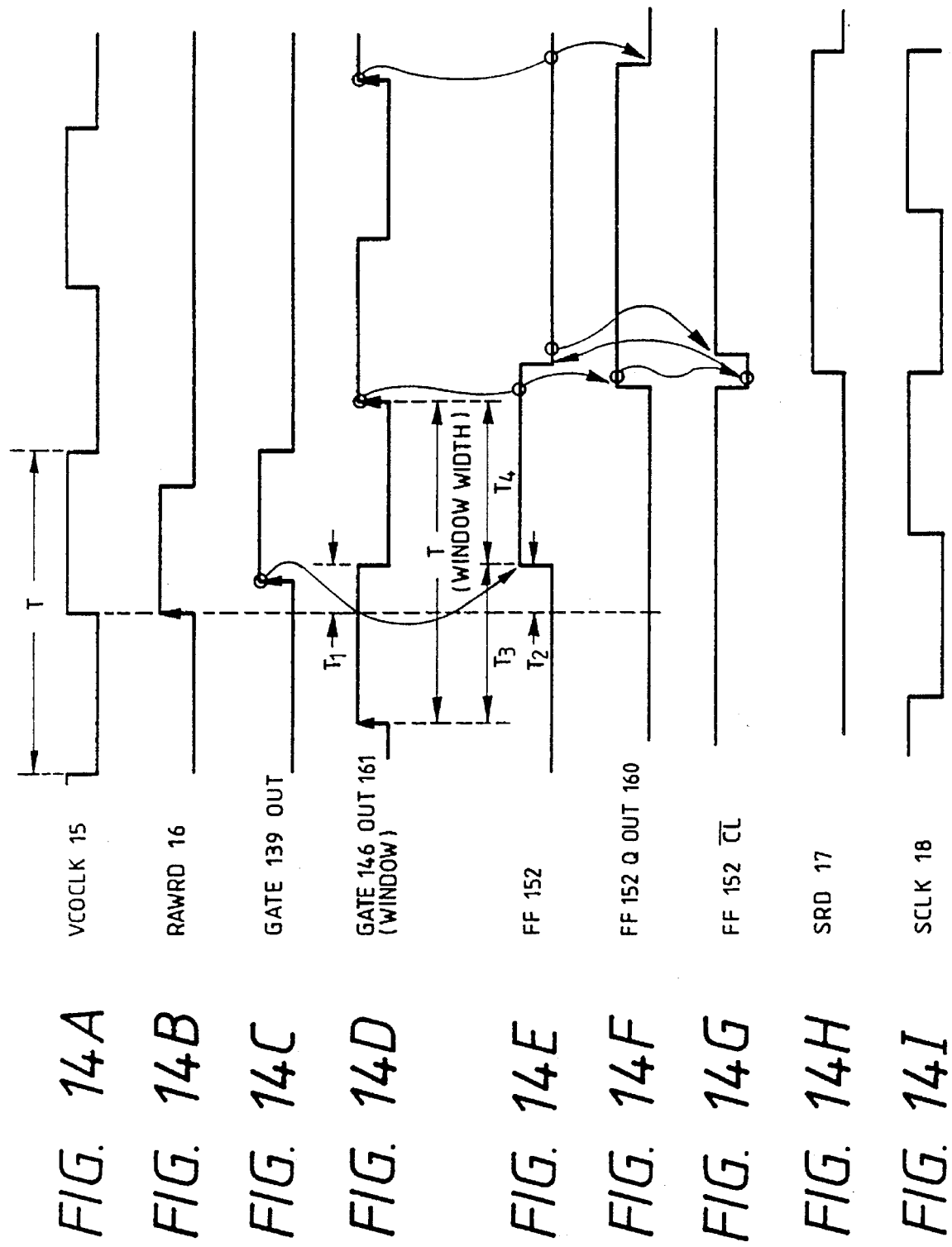

FIG. 19
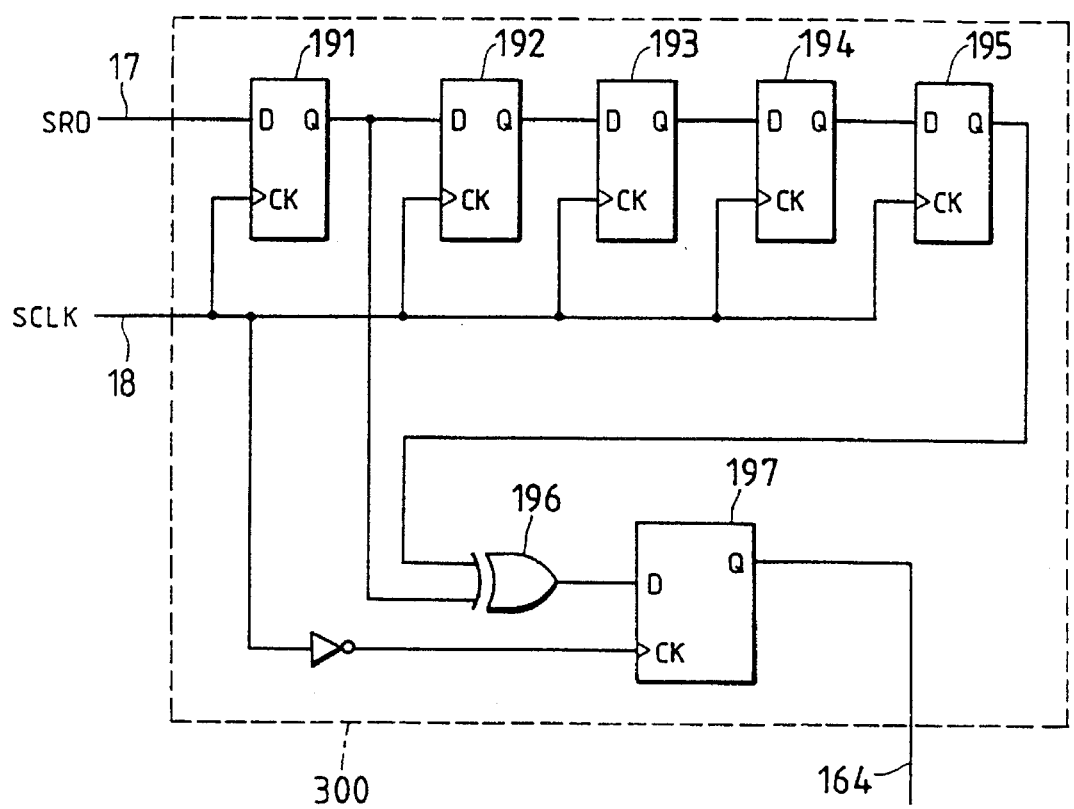
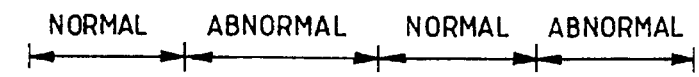
FIG. 21A
FIG. 21B
FIG. 21C
FIG. 21D

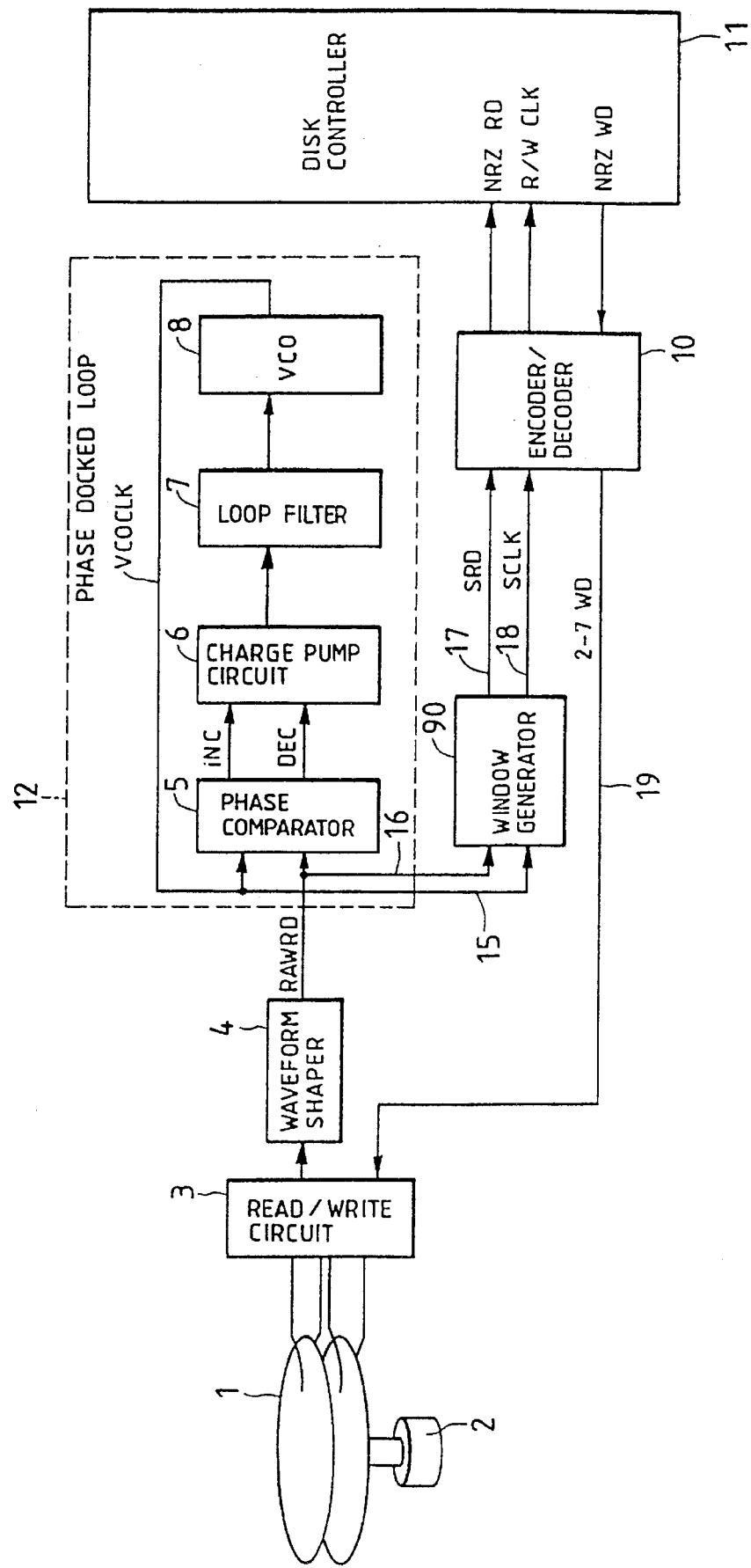

DISK RECORDING APPARATUS WITH ADAPTIVE WINDOW ADJUSTING

This is a divisional of application Ser. No. 07/964,294, filed Oct. 21, 1992 now U.S. Pat. No. 5,402,274, which is a continuation of application Ser. No. 07/734,073, filed Jul. 22, 1991, now U.S. Pat. No. 5,187,615 which is a continuation of application Ser. No. 07/329,552, filed Mar. 28, 1989, now abandoned.

BACKGROUND OF THE INVENTION

1. Field of the Invention

The present invention generally relates to a read/write circuit used for a magnetic disk apparatus, or an optical disk apparatus. More specifically, the present invention is directed to a data separator and a signal processing circuit suitable for constructing a highly integrated circuit with a lower power consumption.

2. Description of the Related Art

In the conventional product, model No. WD10C22, furnished from Western Digital Inc., since the data separator is formed entirely of CMOS devices (Complementary Metal Oxide Semiconductors), only a data separator capable of operating up to approximately 10 Mbps is available. The reason for the limitation in the data separation will be discussed later. In particular, such a limitation is caused by the operating speed of the CMOS. Therefore, it is practically impossible to construct a data separator capable of being operated higher than 15 Mbps.

Also, another conventional data separator and (2–7) encoder/decoder circuit such as 32D532 of SSI Inc. are completely constructed of bipolar transistors. As a result, the power consumption of these circuits becomes approximately 1 W, so that the product reliability will be deteriorated if such a higher power consumption circuit is sealed within a package having a small surface.

Now, consideration will be given to a window generating circuit functioning as a synchronization circuit employed in the data separator. The window generating circuit functions as a portion of a disk drive system as shown in FIG. 22A. The data read from a disk 1 is amplified by a read/write circuit 3, and thereafter converted into a corresponding pulse signal in a waveform shaping circuit 4. This pulse signal corresponds to an original read signal (RAW RD) 16 as illustrated in FIG. 22B. A phase sync circuit 12 employed in the data separator synchronizes RAW RD 16 with a VCO clock (VCOCLK) 15. Then, a window is generated in a circuit 90 so as to detect a pulse of the original read signal 16. By utilizing this window, a synchronization read signal (SRD) 17 is produced. In the circuit of FIG. 22A, reference numeral 10 indicates an encoder/decoder for converting the data, reference numeral 11 represents a disk controller, and reference numeral 2 denotes a spindle motor. Further, reference numeral 18 indicates a synthcronization clock (SCLK) corresponding to the window and reference numeral 19 indicates a write signal.

However, the original read signal 16 contains a jitter component shown in FIG. 22B which is caused by various noises of the signal reproduction and also produced in the read/write circuit 3 and waveform shaping circuit 4, and the fluctuations in the disk rotation. In a normal condition, the jitter value becomes ±40% if the window width is selected to be ±50% from the center.

A jitter component generation mechanism will now be described. As shown in FIG. 22B, during the waveform reproduction step from the disk 1, the practical head reproduction waveform is equal to a synthesized waveform of the head reproduction waveform for a single reverse magnetization. As a consequence, when the reverse magnetization interval is short, magnetic interference is caused. Thus, peaks of the head reproduction waveform before and after the magnetic interference are shifted, as shown in FIG. 22B, as compared with the ideal head reproduction waveform of the single reverse magnetization. RAW RD 16 detects the actual peak of the head reproduction waveform and then forms it as a pulse signal. Accordingly, the front edge of RAW RD 16 is shifted. In general, since the data recorded on the disk 1 is random data, such a peak shift phenomenon frequently occurs.

The phase synchronization circuit 12 in the data separator, on the other hand, does not follow such a high-speed variation as a peak shift. As a result, when the window for detecting the pulse of the original read signal 16 is generated in the window generating circuit 90, a highly precision synchronization circuit is required so as to position the read signal at the center of the window.

However, if the window generating circuit 90 functioning as the synchronization (referred to as a "sync") circuit is formed of CMOS gates a precision window center alignment cannot be achieved. As previously described, since the normal read signal derived from the hard disk fluctuates more than ±40% of the window, the reproduction of the read signal cannot be performed if the window center alignment does not achieve ±8%. As previously stated, the deviation of the window centering in the former case becomes ±20%, which cannot satisfy the normal demand value ±8%. This is because a great influence is caused by the gate delay due to the wiring load if the length of the layout wiring becomes long in case of CMOS gates, and also as there is a large difference between the operating frequencies of two signals within the window generating circuit, a difference is induced between the local heating phenomena, which causes variations in the gate delay of the CMOS gates.

In the latter case of the previous conventional data separator, it is constructed entirely of bipolar arrangements, so that although a high precision window aligment can be realized due to the window generating circuit formed by the bipolar gates, the power consumption becomes high. Since no care is taken to achieve the lower power consumption, a heavy load is applied on the power supply of the system.

Moreover, to adjust the above-described window center, an employment of a delay line with a tap has been proposed in, for instance, Japanese Laid-open Patent Application No. 59-167813 entitled "a phase sync circuit". That is, it is so designed that the original read signal is input via the delay line having a tap to the window generating circuit, and also an adjusting circuit for adjusting a delay amount in the delay line is employed. Thus, a check is made whether or not an error occurs by inputting the data which has been delayed by a predetermined delay amount, whereby a phase shift between the data pulse sequence and window is measured and this measured phase shift amount is adjusted to a proper value. However, according to this prior art, since data delayed by a predetermined delay amount is required, a higher precision is necessarily required in the delay line with a tap. Furthermore, no consideration is given to the temperature drift and aging effect of the delay line having a tap. This causes a problem in cost and precision.

SUMMARY OF THE INVENTION

An object of the invention is to provide a low power consumption data separator capable of aligning a window center with a high precision, whereby the read signal can be normally reproduced.

Another object of the invention is to provide a data separator suitable for constituting a read/write circuit for a magnetic disk apparatus or an optical disk apparatus, in particular, a low power consumption and highly integrated circuit.

Still another object of the present invention is to provide a one-chip data separator which forms a low power consumption and highly integrated type data separator capable of aligning a precise window center.

A further object of the present invention is to provide a data separator, an encoder/decoder, and also a write precompensation circuit, which are signal processing circuits fabricated on a one-chip integrated circuit and operable at a data transfer speed higher than 15M bps.

A still further object of the invention is to provide a data separator employing a delay means capable of automatically adjusting phase.

A yet further object of the invention is to provide a data separator chip employing a delay means having a tap, for performing a highly precise window center alignment so as to normally reproduce the read signal.

To achieve the above-described objects of the present invention, there is provided a one-chip semiconductor circuit. Namely, in an analog circuit unit of a data separator, bipolar transistors are independently employed with respect to MOS transistors in order to consider a high-speed characteristic, a large current drive, and low power consumption. In a digital logic unit, such as a phase comparator circuit, a synchronization circuit, an encoder/decoder circuit, and write compensation circuit, there is employed a BiCMOS gate having an input stage constructed of MOS transistors and an output stage constructed of bipolar transistors.

That is to say, an oscillator unit of a VCO of the data separator is arrayed by bipolar transistors because this unit requires a current output and high-speed operation. An input unit of the VCO is constructed of MOS transistors having high impedances, because a leakage current at the input stage causes deterioration in the characteristic of the VCO.

Then, in a large current mirror circuit with a charge pump circuit, utilizing the higher "gm" (transconductance) of the bipolar transistor than that of the MOS transistor, the bipolar transistor is mainly employed so as to reduce an occupy area of this current mirror circuit with respect to the entire circuitry.

In other analog circuits, utilizing the MOS transistor driven by the voltage with the lower power consumption as compared with the bipolar transistor driven by the current, the MOS transistors are mainly employed.

In the phase comparator and sync circuit as the logic unit of the data separator, there is a difference in local heat generation within a signal transfer path for two signals, since a large difference exists in two operating speeds. In the gate on this signal transfer path, at least one BiCMOS gate is employed, the input stage of which is constructed of a CMOS transistor and the output stage of which is a bipolar transistor so as to reduce any adverse influence of the gate transfer delay time caused by the local heat generation difference. And also, the phase shift caused by the gate transfer delay time difference between two signals is reduced by equally setting the gate stage numbers of the signal transfer paths for these two signals.

In other words, as to the high output load circuit in the sync circuit of the window generating circuit, a BiCMOS gate is employed where the input stage thereof is constructed of CMOS devices and the input stage thereof is arranged by bipolar transistors, whereby a gate delay effect due to the output, load, and local heat generation is reduced, and a CMOS gate is employed for the small output load portion. Furthermore, according to the present invention, the gate stage number of the read data from the disk apparatus which has passed from the disk apparatus to the sync data generating unit within the sync circuit, is equally set to that of the VCO clock as the VCO output of the phase sync circuit, which has passed from the sync circuit to the sync data generating circuit. In accordance with the present invention, the wiring length of the gate is matched at a precision lower than 50%, so that the phase shift caused by the gate transfer delay time of these two signals can be suppressed within 0.3 ns, and also the power consumption can be considerably lowered. In case of the operating speed for 15M bps, a delay difference higher than 0.3 ns is not an allowable value as the window margin loss.

Since the output load is great, the clock supply gates of the code encoder and code decoder circuit cause deterioration for the high speed operation. To this clock supply gate, the above-described BiCMOSgate is employed which more or less depends upon the operating speed for the output load.

Then, the write compensating circuit detects the pattern of the encoded write code data, and adds a delay amount corresponding to this pattern to the write code data. The high speed characteristic is required for detecting the pattern, whereas high precision is required for the delay amount added to the write code data over the wide temperature range. These two different requirements can be satisfied by employing the BiCMOS gate as the arrangement gate within the write compensating circuit.

The signal transfer delay time of a BiCMOS gate is represented by the following equation (1):

$$tpd = t_0 + (1/\beta) \cdot (V_{LT} C_L / I_D) \quad (1)$$

where:

$t_0$: a delay time irrelevant to a load capacity $C_L$ (309 of FIG. 15A), $I_D$: a drain current of a MOS transistor, $V_{LT}$: a logic threshold voltage, : a current amplification of a bipolar transistor ($\beta = 100$).

The construction of the CMOS gate is shown in FIG. 15B, and the signal transfer delay time is expressed by the following equation (2):

$$tpd = t_1 + (V_{LT} C_L / I_D) \quad (2)$$

where, $t_1$: a delay time independent from a load capacity $C_L$ (314 of FIG. 15B).

Accordingly, the signal transfer delay time of the BiCMOS gate is not influenced by $1/\beta$ of the load capacity $C_L$, as compared with that of the CMOS gate.

On the other hand, both the $V_{LT}$ and $I_D$ are susceptible to the temperature, and therefore the above-described signal transfer delay time is influenced thereby. Also in this case, the BiCMOS gate is hardly influenced by $1/\beta$, as compared with the CMOS gate.

As illustrated in FIG. 15A, the BiCMOS gate is arranged. The current is substantially zero since the input stage connected to the output stage is constructed by NOS transistors (310, 302, 303, 304) even if such a gate circuit is employed where the time during which the current flows through NPN transistors (307, 308) in the output stage is small and the output stage is constructed of the bipolar gate circuit. Therefore, even when such a gate circuit in the output stage is constructed of the bipolar circuit, the power consumption is considerably lower than that of the gate circuit formed entirely of bipolar transistors.

If the low drive load of the output stage is small, the lower power consumption can be achieved by employing a gate circuit formed by CMOS transistors (310, 311, 312, 313), as shown in FIG. 15B.

With the above-described circuit arrangements according to the invention it is possible to provide such a one-chip data separator that by employing a circuit where the bipolar transistors and CMOS transistors are mixtured in the BiCMOS process, the total power consumption is lower than 700 mW and the signal transfer speed is higher than 15M bps. In addition, according to the invention, when the original read signal is input into the sync circuit as the window generating means, a delay amount is sequentially shifted via the variable delay means during the adjusting mode; a check is made whether or not an error is caused from the window by monitoring the output of the sync circuit by using the window error detecting means; a calculation is made on the required delay amount on the basis of the maximum and minimum delay amounts of the reproducable delay amounts; and the arrangement for setting the maximum value during the normal mode is added. As a result, the required delay amount can be determined by a relative division ratio, whereby the window center alignment can be achieved without being influenced by the precision of the delay means or temperature characteristics.

BRIEF DESCRIPTION OF THE DRAWING

FIG. 11 illustrates the phase shift operation in the phase shift circuit 106 shown in FIG. 10;

FIG. 12 is a timing chart for representing the phase shift timing of the phase shift circuit 106 shown in FIG. 10;

FIG. 13B is an illustration for explaining a detailed circuit arrangement of the flip-flop 152 shown in FIG. 13A;

FIG. 14A to 14I are waveforms for representing a major unit shown in FIG. 13A;

FIG. 19 is a circuit diagram of a detailed window error detecting circuit 300 shown in FIG. 16;

FIGS. 21A to 21D are timing charts for showing an operation of the second preferred embodiment shown in FIG. 16; and, FIGS. 22A and 22B are an arrangement and a waveform for explaining the problems occurring in the conventional disk apparatus.

DETAILED DESCRIPTION OF THE PREFERRED EMBODIMENTS

Referring now to figures, a data separator according to the invention will be described.

First, a description will now be made that the present invention is applied to a (2-7) encoder/decoder built-in type data separator IC with reference to FIG. 1.

Figure 1:
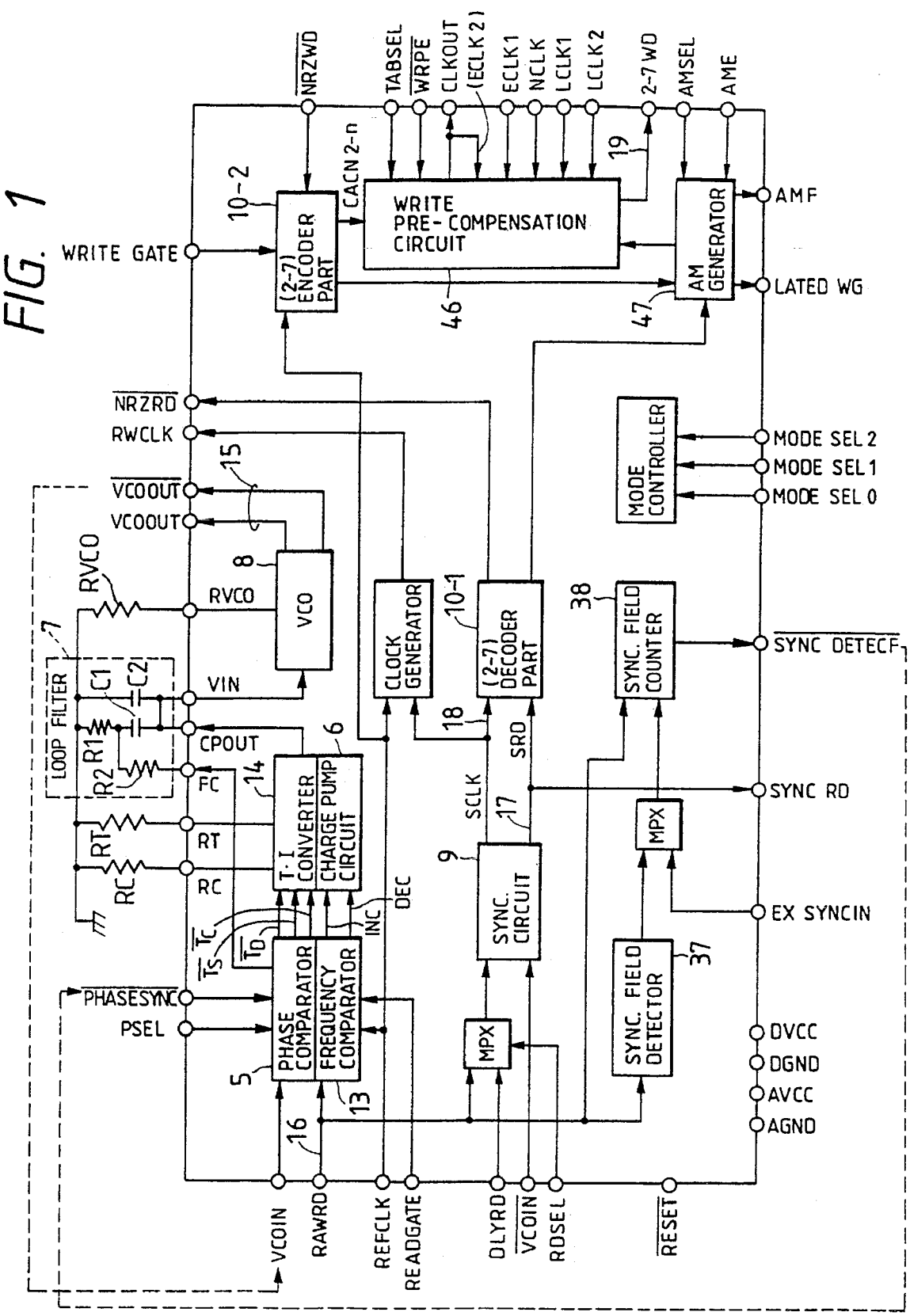
FIG. 1 is a block diagram of an encoder/decoder quilt-in type data separator according to one preferred embodiment of the invention.

In FIG. 1, the (2-7) encoder/decoder built-in type data separator IC is constructed of a data separator unit; a (2-7) encoder/decoder unit; an address mark (AM) generating circuit unit; and a write precompensation circuit unit. This data separator unit includes a voltage control oscillator (VCO)8, a time-current (T-I) converting charge pump 14, a charge pump circuit 6, a phase comparator 5, a frequency comparator 13 and a synchronization circuit (referred to as a "sync circuit") 9, and also a loop filter 7 externally connectable. The (2-7) encoder/decoder unit is constructed of a (2-7) decoder unit 101 for converting both synchronized read data (SRD) 17 generated from the sync circuit 9 in the data separator unit and a synchronized clock (SCLK) 18 into read NRZ data (NRZRD), and also a (2-7) encoder unit 10-2 for converting write NRZ data (NRZWD) into (2-7) code during the data writing operation.

In FIG. 1, the elements surrounded by a solid line are formed as a one-chip integrated circuit (IC). Each of terminals denoted in FIG. 1 will be successively explained. A basic operation of the (2-7) encoder/decoder unit is referred to, for instance, U.S. Pat. No. 4,115,768 and U.S. Pat. No. 4,146,909.

The phase comparator 5, frequency comparator 13, T-I converting charge pump 14, charge pump 6, loop filter 7 and VCO 8 will constitute a phase sync circuit having a function to synchronize the VCO clock (VCOCLK) 15 with the original read signal (RAW RD) 16. It should be noted that when the original read signal (RAW RD) 16 supplied from the disk corresponds to data, both the phase comparator 15 and T-I converting charge pump circuit 14 are operated, whereas both the frequency comparator 13 and charge pump circuit 6 are actuated in case that the original read signal (RAW RD) from the disk corresponds to the sync pattern so as to capture the frequency.

Figure 2:
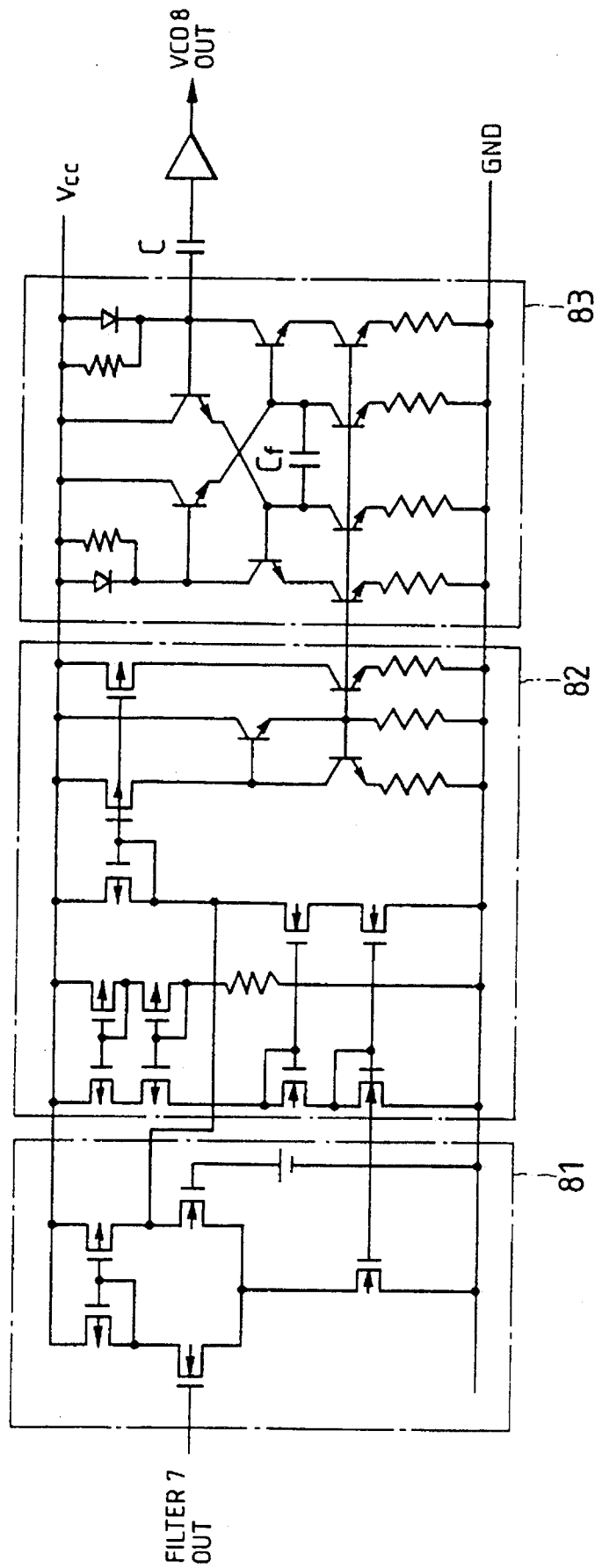
FIG. 2 is a circuit diagram of a detailed VCO8 shown in FIG. 1.

In FIG. 2, there is shown a detailed voltage control oscillator 8 employed in an IC shown in FIG. 1, the VCO 8 being formed by an input stage 81, a current mirror circuit 82, and a VCO oscillating unit 83. As is apparent from FIG. 2, this input stage 81 is constructed of MOS an transistor having a higher input impedance, and an output of which is transferred via a current mirror circuit 82 to the VCO oscillating unit 83. Since the VCO oscillating unit 83 requires a high-speed operation, it is constructed of bipolar transistors.

Figure 3:
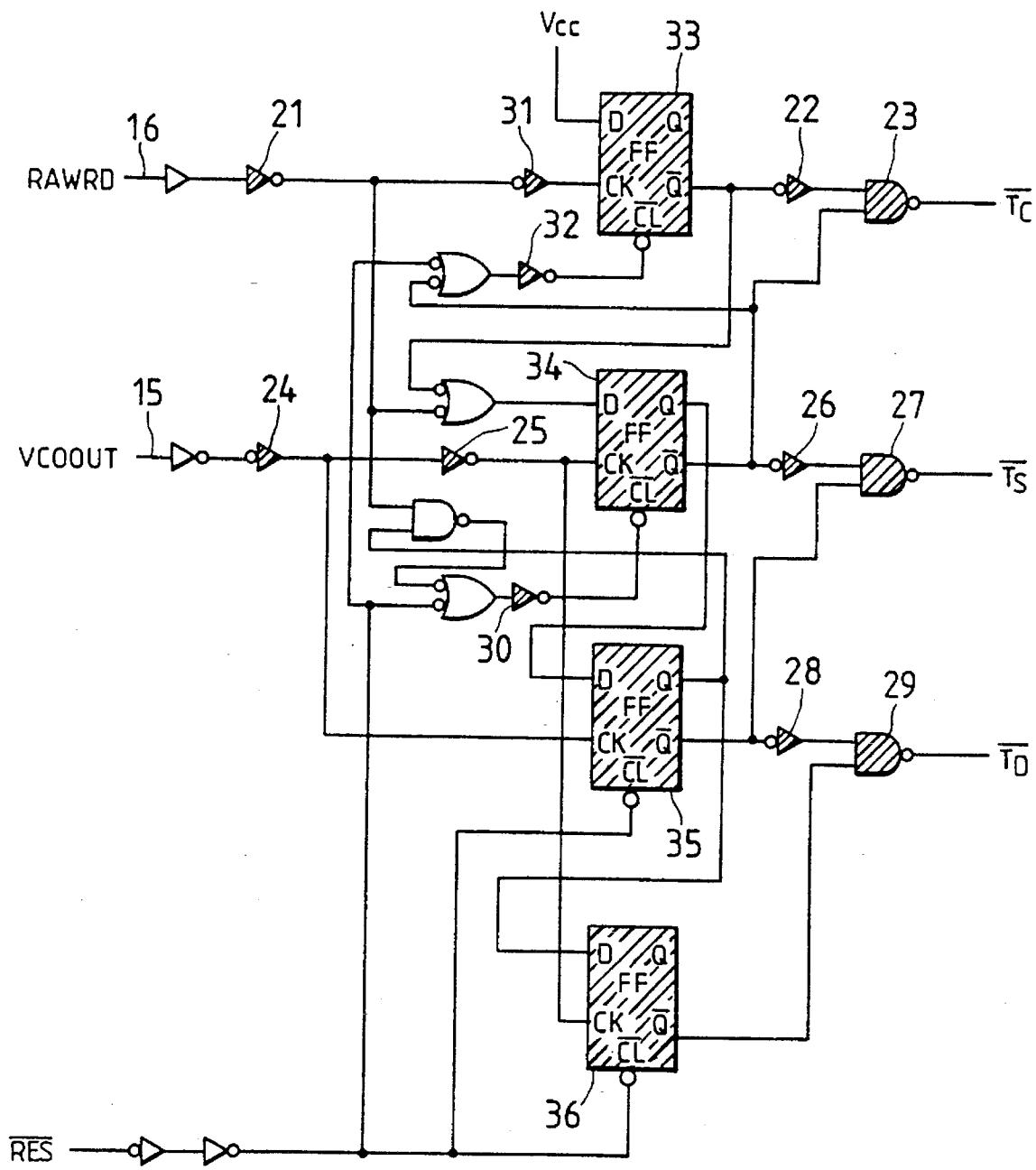
FIG. 3 is a circuit diagram of a detailed phase comparator 5 shown in FIG. 1.

FIG. 3 is a detailed circuit arrangement of the phase comparator 5 which is validated during the data read operation. In this phase comparator 5, a detection is made of a phase difference between the RAW RD signal 16 as the read data from the magnetic disk 1 and the VCO OUT signal 15 as the output from VCO 8. From the phase comparator 5, a sampling pulse Ts is output for generating pulses $T_C$ and $T_D$ having time widths corresponding to this phase difference, and also a time difference between these pulses.

Gates 21 to 32 and flip-flops (FF) 33 to 36 indicated by inclined lines in the circuit elements constituting this phase comparator 5 employ a BiCMOS gate, the output stage of which is formed by the bipolar transistor so as to suppress the vibrations in the gate delays.

Figure 4:
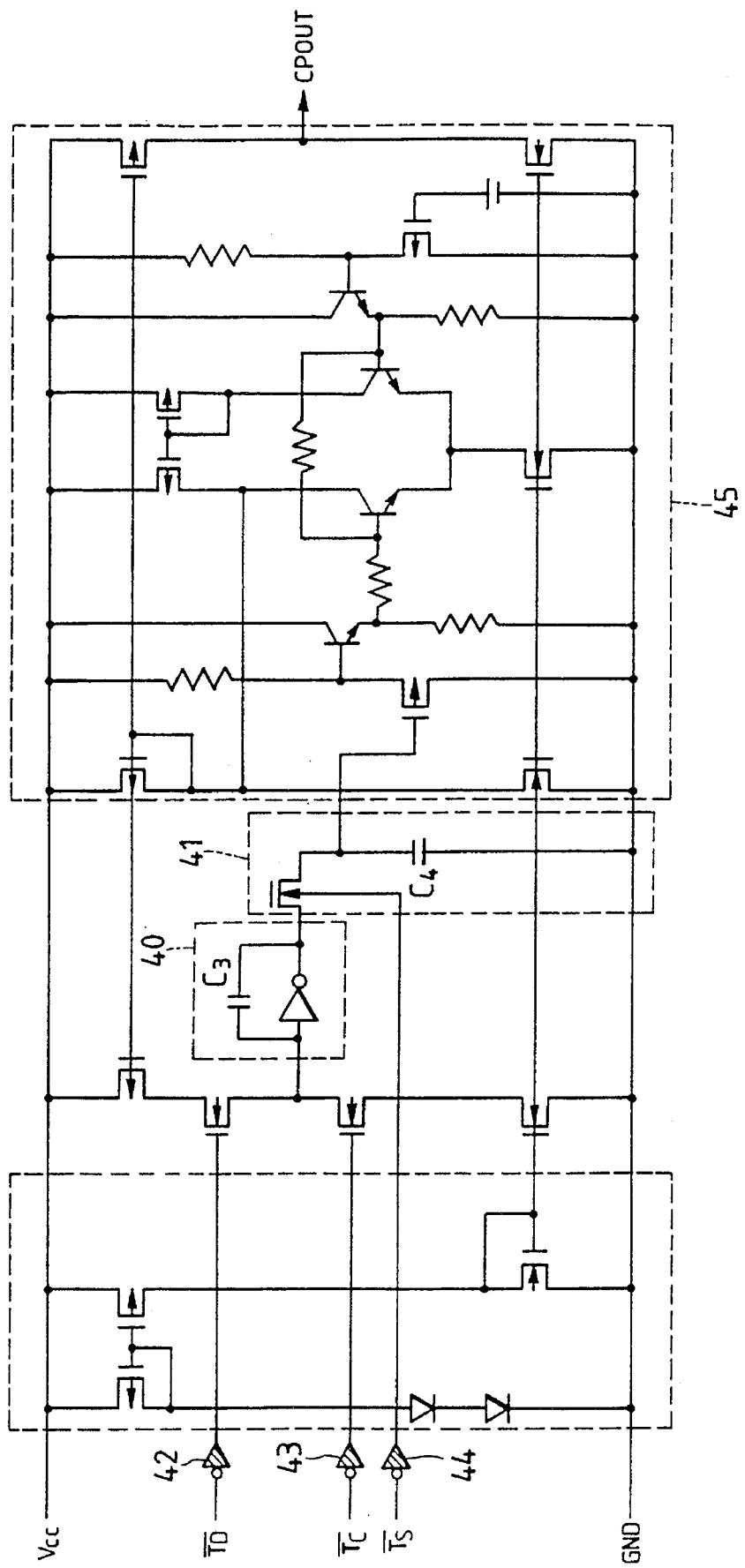
FIG. 4 is a circuit diagram of a T-I converting charge pump circuit 14 shown in FIG. 1.

Similarly, FIG. 4 is a detailed circuit diagram of the T-I converting charge pump circuit 14 shown in FIG. 1. The charge pump circuit 14 is constructed of an integration circuit 40 for converting a pulse difference between the pulses $T_D$ and $T_C$ into a voltage in receipt of the pulses $T_D$, $T_S$, $T_C$ as the outputs of FIG. 3; a sample and hold circuit 41 for sampling/holding the output from the integration circuit 40 in response to the circuit 45 for converting the output from the sample and hold circuit 41 into a current. In the input stage of the T-I converting charge pump circuit 6, BiCMOS gates 42, 43 and 44 are employed for receiving the pulses $T_D$, $T_S$ and $T_C$.

As illustrated in FIG. 1, the output derived from the T-I converting charge pump circuit 14 is connected to the loop filter 7 externally connected to the IC, again converted into the corresponding voltage, and then the resultant voltage is applied to the VCO unit 8. The phase comparator 5, T-I converter 14, loop filter 7 and VCO 8 constitute a closed loop. Finally, a negative feedback is operated so as to adjust the phase difference between the RAW RD signal 16 and VCO OUT signal 15.

It should be noted that when the read data RAW RD 16 from the disk 1 corresponds to the sync pattern, the sync field detecting circuit shown in FIG. 1 detects the sync field. Also, it is confirmed that the sync field counter circuit 38 corresponds to the sync field and this confirmation is continued for a predetermined time period. The sync field counter 38 outputs this confirmation time period from SYNC DETECT as the pulse. The output pulse is connected from the outside of IC shown in FIG. 1 to a PHASE SYNC input.

Consequently, when the read data (RAW RD) from the disk corresponds to the sync pattern, the pulse having a constant time period is input to the PHASE SYNC input. During this time period, both operations of the phase comparator 5 and T-I converting charge pump 2 are interrupted, and alternatively, both the frequency comparator 13 and charge pump circuit 6 are operated so as to capture the frequency.

Figures 5, 8:
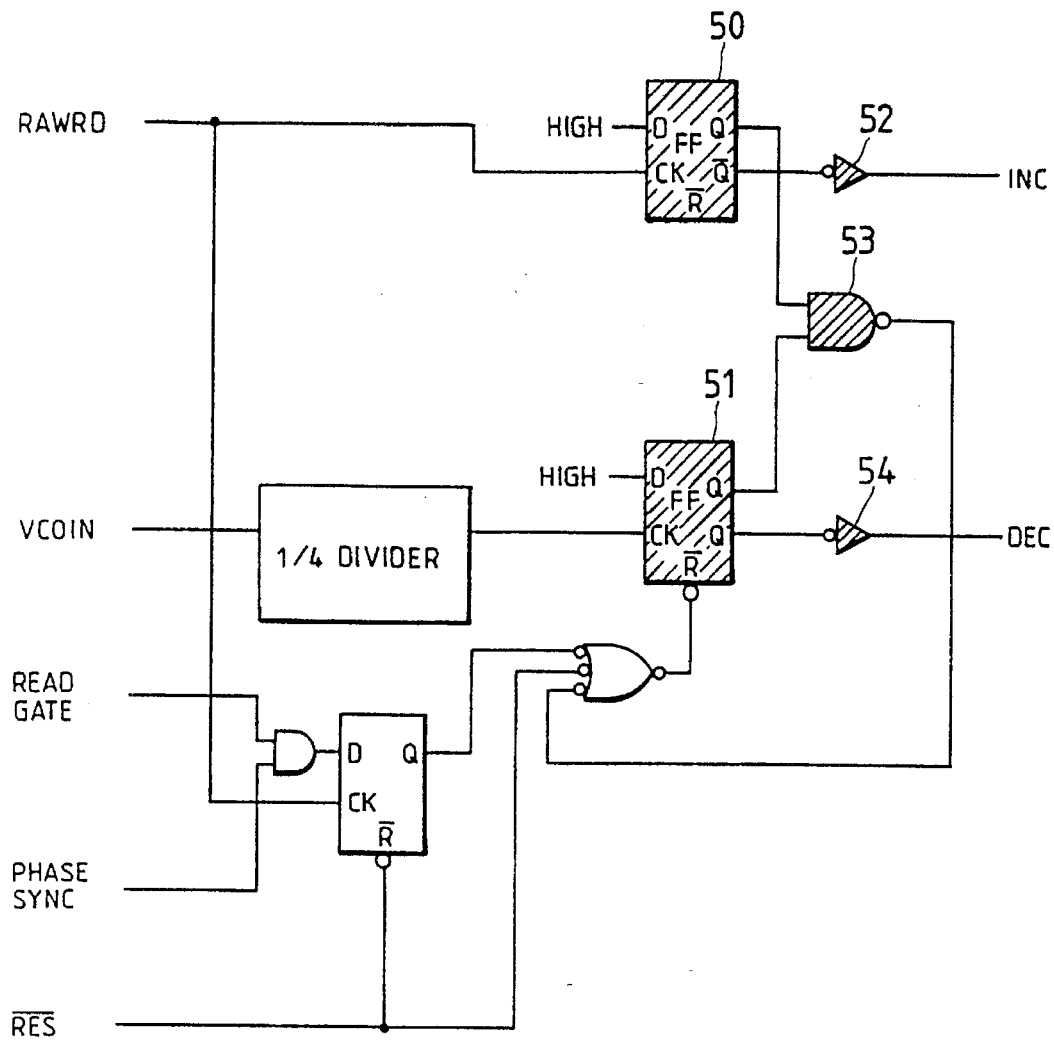
FIG. 5 is a circuit diagram of a frequency comparator 13 shogun in FIG. 1.
FIG. 8 is an illustration of a decode rule for the (2-7) decoder circuit 72 shown in FIG. 7.

As illustrated in FIG. 5, the frequency comparator 13 is constructed of DiCMOS flip-flops 50, 51 and BiCMOS gates 52 to 54 which are bipolar arrangements for the output stage thereof. In this frequency comparator 13, when the SYNC pattern input from the read data (RAW RD) thereinto is equal to ¼ frequency of the VCO clock, detections are made to both a frequency difference and a phase difference between an output produced by frequency-dividing the VCO clock by ¼, and the SYNC pattern signal input from RAW RD. When the VCO clock leads, a pulse with this lead difference is derived from DEC output. To the contrary, when the VCO clock delays, another pulse with this delay difference is output from an INC output.

Figure 6:
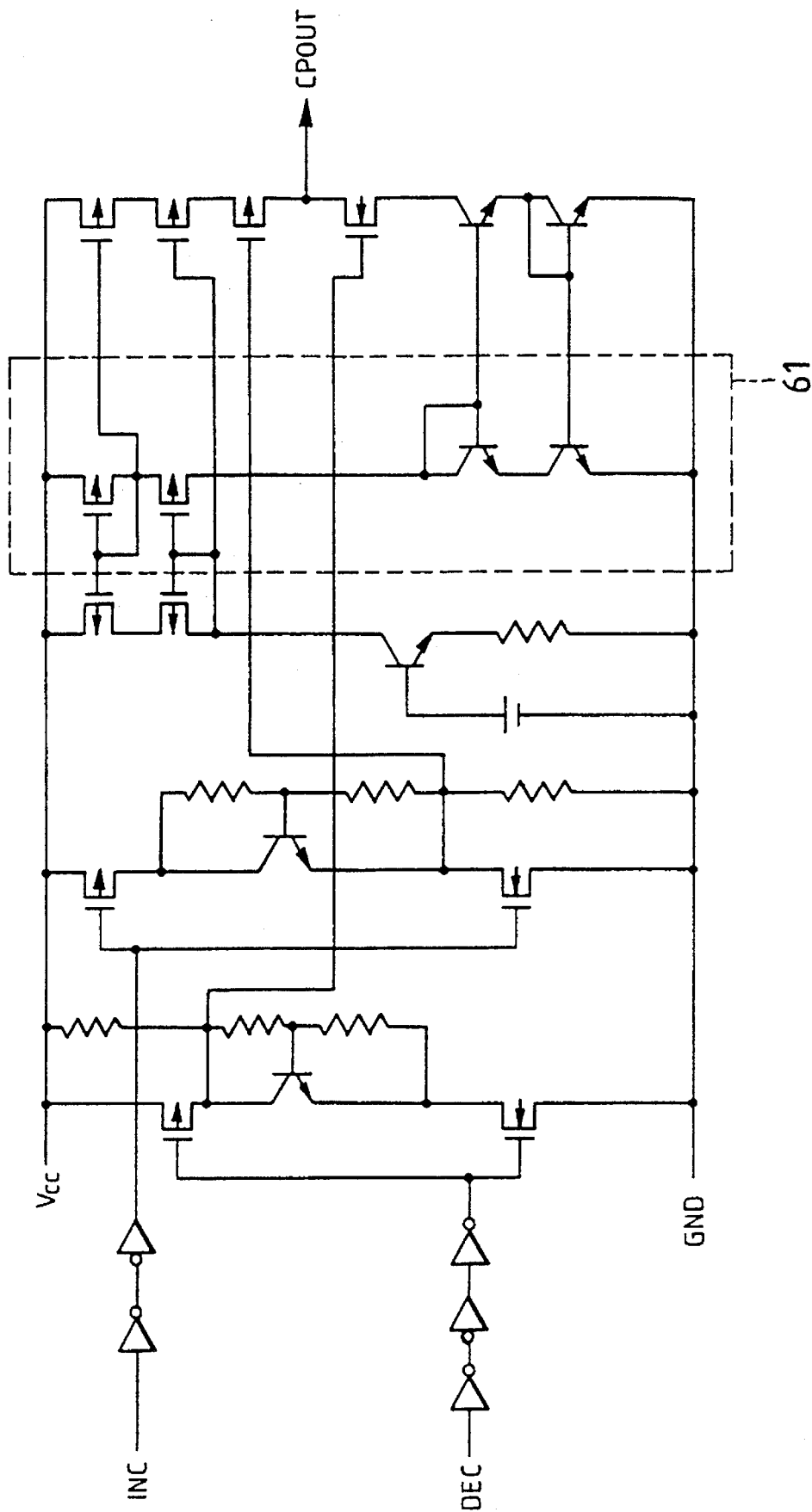
FIG. 6 is a circuit diagram of a detailed charge pump circuit 6 shown in FIG. 1.

Then, both this INC signal and DEC signal are received by the charge pump circuit 6 as shown in FIG. 6. The function of this charge pump circuit 3 is to draw out a current determined by a large current mirror circuit 61 formed by a composite circuit of MOS and bipolar transistors only during a time period corresponding to a pulse width of either the INC signal or DEC signal in case of the INC pulse. This charge pump circuit 3 draws this current in case of the DEC, whereby the voltage of the loop filter 7 is changed. The reason why the NPN type bipolar transistor circuit is employed in the current mirror circuit, is as follows. Since the current drawing amount of the charge pump (CPOUT) is extremely high, if the current mirror circuit is constructed of MOS transistors, the sizes of these transistors becomes considerably great because of small "m" (trans-conductance) thereof. However, since the current amplification of the PNP type bipolar transistor is extremely small for the current flowing out, PMOS transistors are employed for the current mirror circuit.

Figure 7:
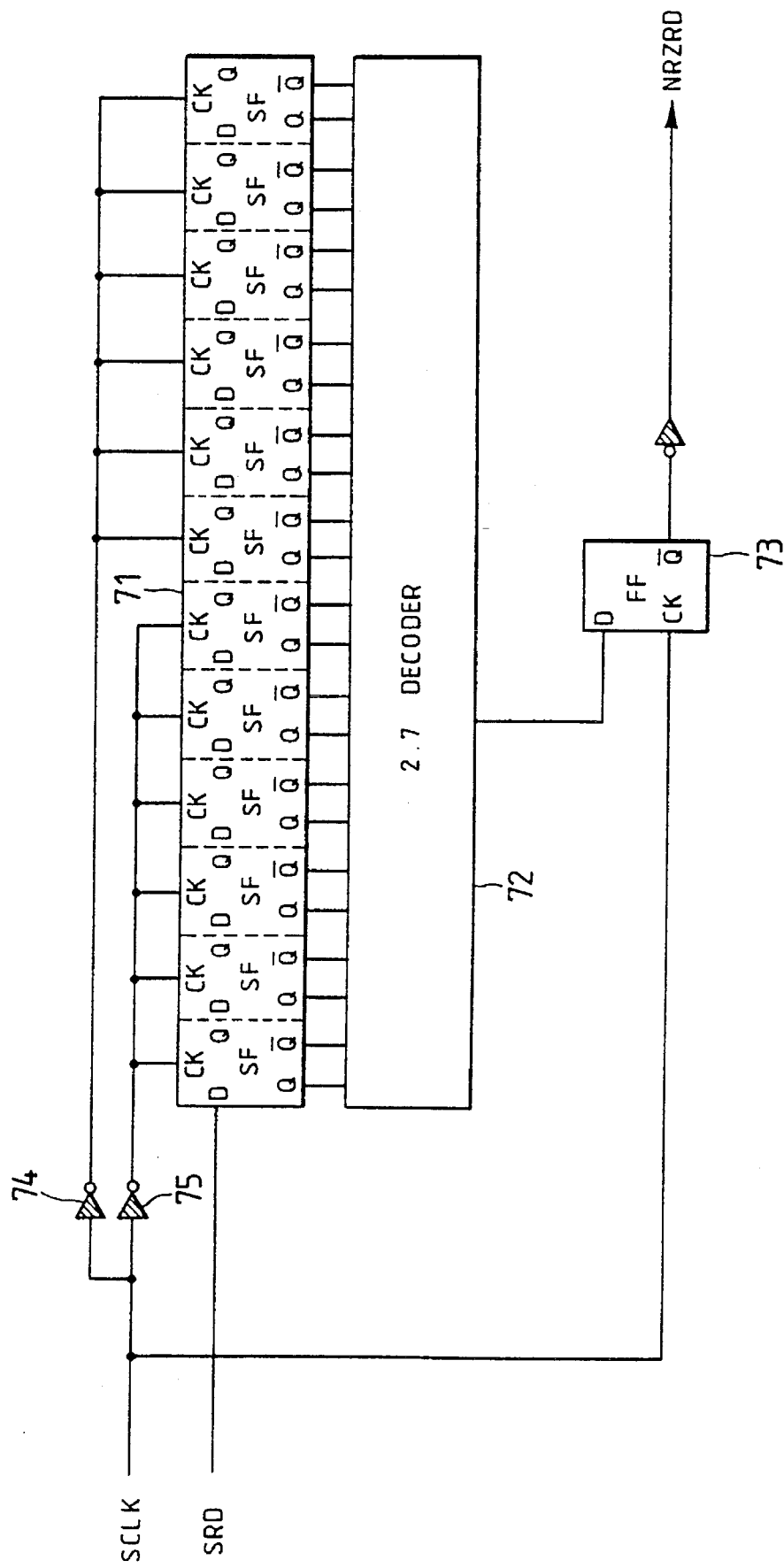
FIG. 7 is a circuit diagram of a detailed (2-7) decoder unit 10-1 shown in FIG. 1.

Subsequently, both the frequency drawing and phase drawing have been accomplished by the above-described descriptions. RAW RD is converted into the signal (SRD) synchronized with the VCO clock in the sync circuit 9, and thereafter input into the (2-7) decoder unit 101 shown in FIG. 7. The (2-7) decoder unit 10-1 is arranged by a 12-bit shift register 71, a (2-7) decoder 72 for executing a decode rule shown in FIG. 8, a flip-flop 73 and BiCMOS gates 74 and 75 for supplying the clock to the shift register 71. The shift register 71 generates a bit stream for detecting a (2-7) code pattern shown in FIG. 8. The (2-7) decoder 72 has a function to convert the (2-7) code shown in FIG. 8 into an NRZ signal. The reason why the BiCMOS gate is employed is that the load is heavy.

Figure 9:
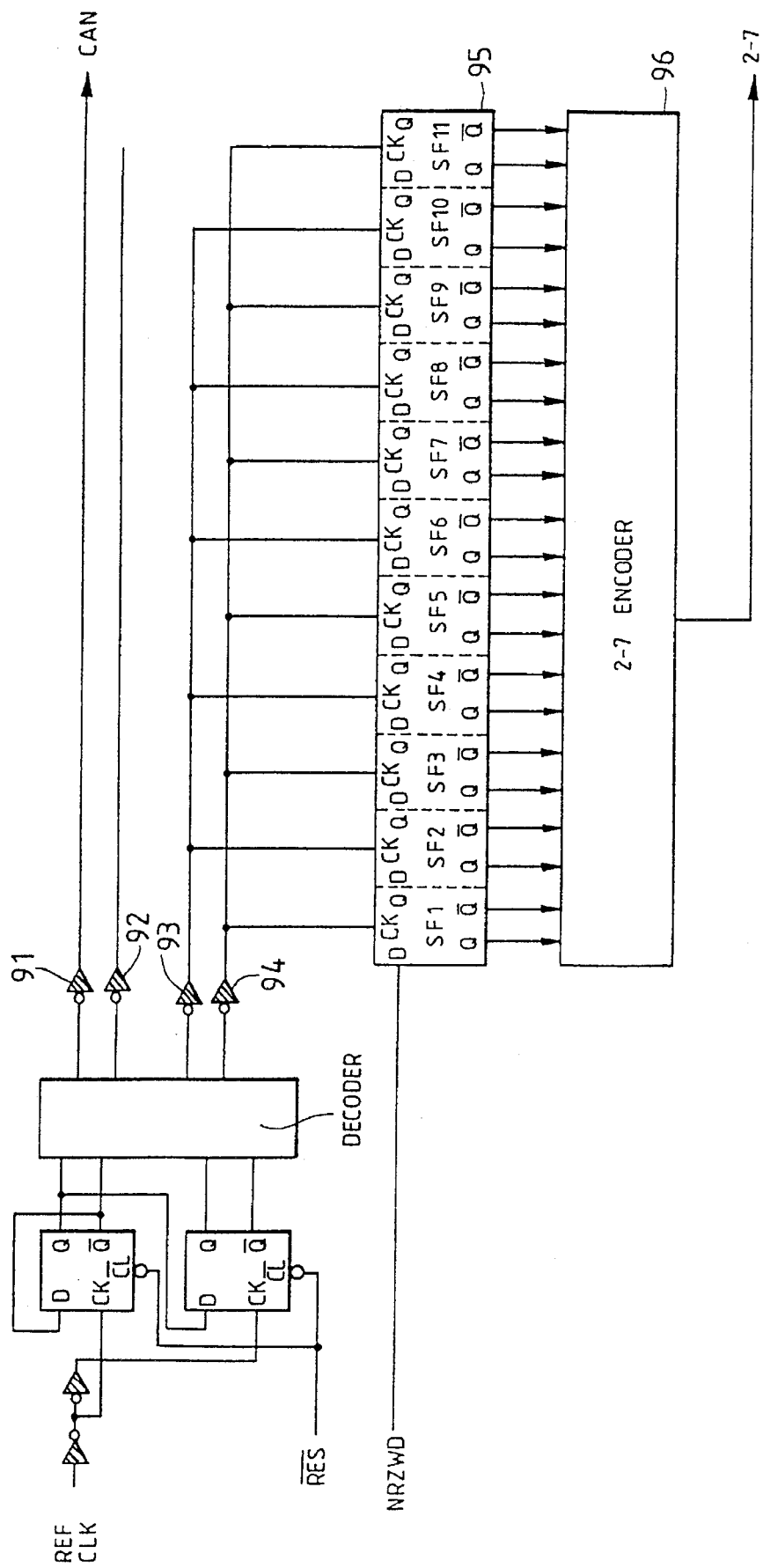
FIG. 9 is a circuit diagram of a detailed (2-7) encoder unit 10-2 shown in FIG. 1.

Then, in the write mode, the (2-7) encoder unit 10-2, write precompensation circuit 46, and address mark (AM) generating circuit 47 are utilized. The (2-7) encoder unit 10-2 is, as illustrated in FIG. 9, constructed of a 11-bit shift register 95 for generating a bit stream so as to detect a pattern of an NRZ signal; a (2-7) encoder 96 for executing a conversion rule for a (2-7) code from the NRZ signal shown in FIG. 8; and BiCMOS gates 93 and 94 for supplying a clock to the shift register 95.

Figure 10:
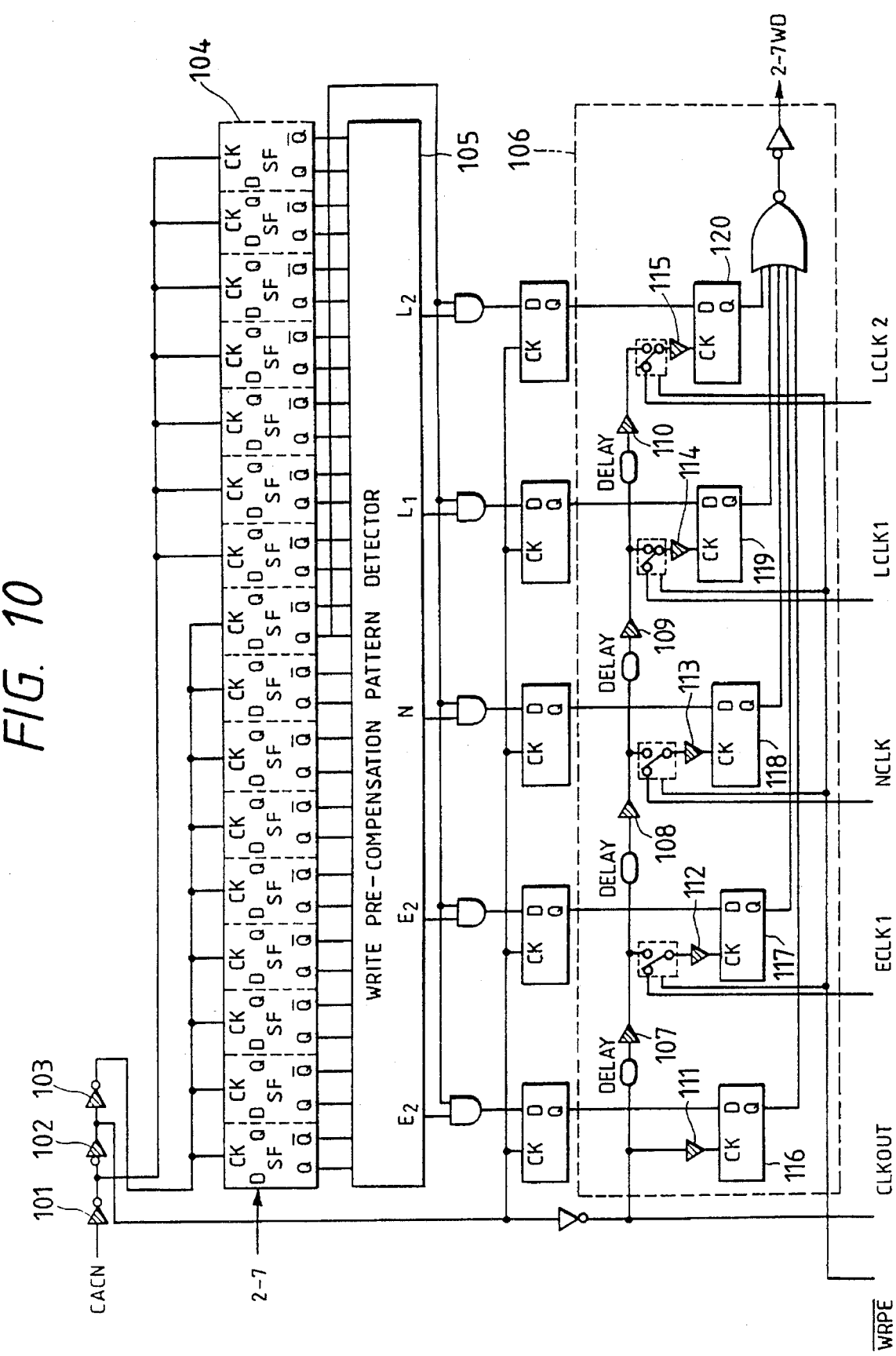
FIG. 10 is a circuit diagram of a detailed write precompensation circuit 46 shown in FIG. 1.

The output from the (2-7) encoder unit 10-2 is input into the write precompensation circuit 46 shown in FIG. 10. This write precompensation circuit 46 is arranged by a shift register 104, a write precompensation pattern detecting circuit 105 and a phase shift circuit 106. In the write precompensation circuit 46, such a bit stream condition is produced with a (2-7) code pattern in the shift register 104, that the number "n" of zero between 1 and 1 and the number "m" of zero between the next 1 and 1. The write precompensation pattern detecting circuit 105 shown in FIG. 10 detects one of the phase shift patterns shown in FIG. 11. The phase shift corresponding to the pattern is performed in the phase shift circuit 106. The delay operation of the phase shift is set in this case by adjusting the externally connected delays from the built-in delay, or terminals of ECLK, NCLK, LCK1 and LCLK2. The timing of the phase shift is illustrated in FIG. 12. In FIG. 12, symbol "N" indicates a standard timing signal; symbol "E1" is a timing signal whose phase is earlier than that of the standard timing signal; symbol "E2" denotes a timing signal whose phase is even earlier than that of the timing signal "E1". Symbol "L1" is a timing signal whose phase is later than that of the standard timing signal. Symbol "L2" denotes a timing signal whose phase is even later than that of the timing signal "L1". Similarly, as the clock supply gate for the shift register 105, BiCMOS gates 101, 102, and 103 are employed, taking account of the heavy load. Also, BiCMOS gates 107, 108, 109, and 110 are employed as a gate for delay purposes. The input signals of CK terminals of flip-flops 116 to 120 are used to realize the write precompensation. Input buffers 111 to 115 provided at the inputs of these flip-flop employ BiCMOS gates having a small fluctuation in the delay amounts.

It has been described in detail, according to the first preferred embodiment, that a proper selection is effected in employment of the BiCMOS gates, bipolar transistors, and MOS transistors, whereby the (2-7) encoder/decoder built-in type data separator capable of transferring the data at the higher speed can be realized with low power consumption. However it should be noted that descriptions on the respective terminals of the data separator will be made in the last description of the preferred embodiment.

Referring now of FIGS. 13A and 14, a description will be made to a preferred embodiment of the sync circuit 9 shown in FIG. 1, where a precise window center alignment is realized. As previously described, the sync circuit 9 generates a window based upon the VCO clock to produce a read signal (SRD) 17 in synchronism with this window, and outputs the sync clock (SCLK) 18 together.

Figure 13A:
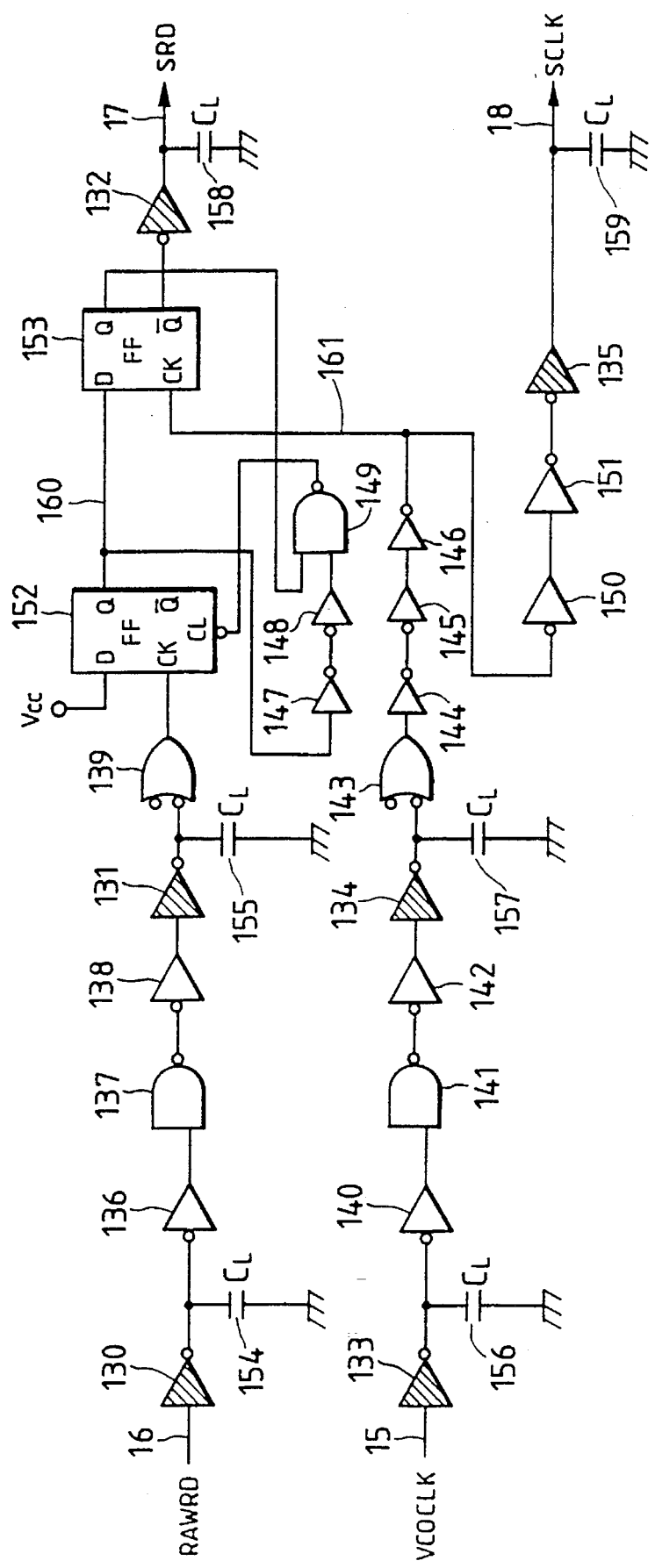
FIG. 13A illustrates a detailed sync circuit 9 shown in FIG. 1.
Figure 15A:
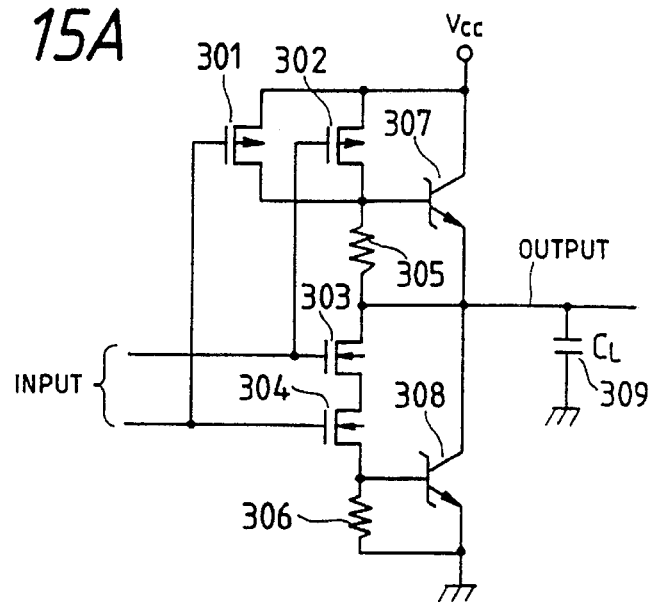
FIGS. 15A and 15B are circuit diagrams for explaining the gate characteristics of the BiCMOS gate and CMOS gate.
Figure 15B:
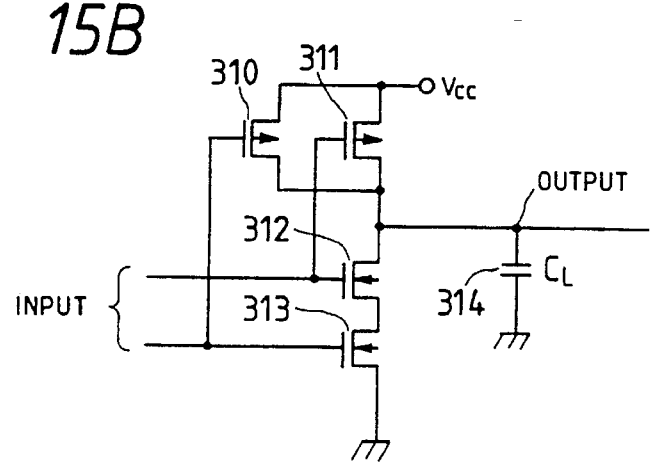

In FIG. 13A, when the original read signal (RAW RD) 16 is input from the gate 130, a flip-flop (FF) 152 functioning as a latch circuit is set via gates 136, 1 37, 138, 131 and 139. On the other hand, VCOCLK 15 is input from a gate 133 and input via gates 140 to 142, 134, 143 to 146 into a CK terminal of a flip-flop (FF) 153 functioning as a sync data generating unit. FF 153 sets data 160 of Q-out at the same timing of an output 161 of the gate 146. When FF 153 is set, a reset signal for FF 152 is produced by the gate 149, and then input into a CL terminal so as to reset FF 152.

That is, in the sync circuit 9, the window is generated from the output of the gate 146 based upon the signal of VCO clock 15. The original read signal 16 is drawn into the sync data generating unit 153 in response to the rising edge thereof, thereby to output it as the sync read signal (SRD) 17, and also outputs the output clock from the gate 135 as the sync clock (SCLK) 18.

In this case, as illustrated in FIG. 14D, the window is defined by a cycle of the set FF 152 from the rising edge of the output from the gate 146 to the next rising edge. As a consequence, in the PLL stable time period during which the rising phase of the VCO clock 15 is coincident with the rising phase of the original read signal (RAW RD) 16, the rising of FF 153 functioning as the sync data generating unit must be in a center of a window.

That is to say, $T_3=T_4=T/2$ (3), where "T" indicates a window width. To satisfy this equation (3), the delay time $T_2$ during which the original read signal (RAW RD) 16 is transferred from the gate 130 to the Q-output of FF152 must be equal to the delay time $T_1$ during which the VCO clock 15 is transferred from the gate 133 to the gate 146.

On the other hand, since output wiring load capacities (L154, 155) of the gates 130 and 131 in the circuit from the gate 130 to FF 152 is great, BiCMOS gates are employed as the gates 130 and 131 according to the preferred embodiment. By selecting the gate stage number from the gate 130 to the Q-output of FF 152 to be equal to that from the gate 133 to the gate 146, both the delay time periods "$T_1$" and "$T_2$" can be equal to each other. As shown in FIG. 13B, the gate stage number for the FF 152 circuit is selected to be 3 in the preferred embodiment. As a consequence, 3-stage inverter gates 144, 145, 146 are inserted at the VCO clock side so as to compensate for the gate time delays caused by the three staged gate.

Since the operating frequency of the original read signal (RAW RD) 16 is more than two times higher than that of the VCOCLK clock 15, there is a difference in the local heat generations. However, since the BiCMOS gate has been employed in the preferred embodiment, $T_1=T_2$ is maintained even in the temperature variation. Although a part of the gate circuit has employed the BiCMOS gate in the above-described preferred embodiment, the precision could be furthermore improved by constructing all of this gate circuit with BiCMOS gates.

Figure 18:
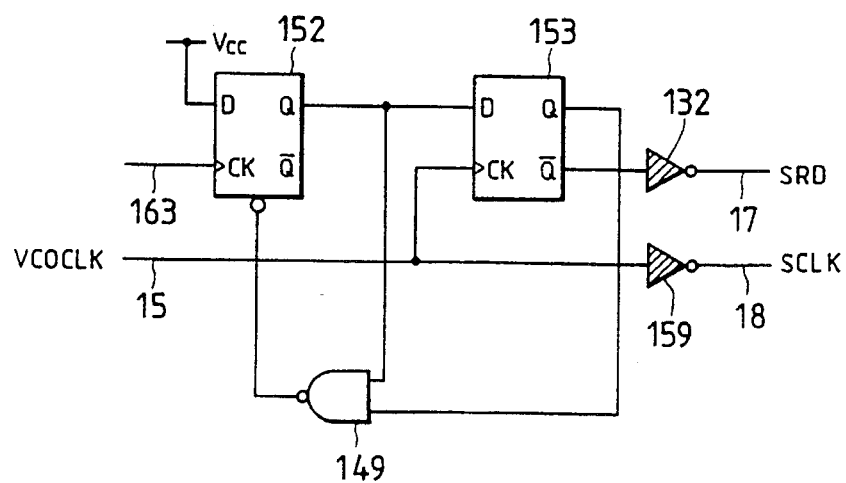
FIG. 18 is a circuit diagram of a detailed sync circuit shown in FIG. 16.

A second preferred embodiment according to the present invention will now be described with reference to FIGS. 16 to 21. According to the second preferred embodiment, there are employed as an additional block a window center adjusting circuit 200, and a window error detecting circuit 300 in addition to the IC circuit of the first preferred embodiment shown in FIG. 1. FIG. 17 shows a detailed internal circuit arrangement of the window adjusting circuit 200. FIG. 18 is a detailed internal circuit arrangement of a synchronization (sync) circuit 9' instead of the previous sync circuit 9. Furthermore, FIG. 19 is a detailed internal circuit diagram of the window error detecting circuit 300. As will be discussed later, the window error detecting circuit 300 is constructed of a shift register and an exclusive OR gate. The window center adjusting circuit 200 is formed by a signal generating circuit 170 for generating a test pattern as a 4T pattern shown in FIG. 21A from REFCLK; a switch 171 for switching a read signal (RAW RD) 16 and a test pattern 172; a delay buffer line 173 formed by combining CMOS inverter gates $GC_1$ to $GC_n$ and BiCMOS inverter gates $GB_1$ to $GB_n$; a selector 174 for selecting one of the taps of the delay buffer line to output a selected delay output signal; and, a register 175 for selecting the selector. The sync circuit 9' has the same function as the sync circuit 9 shown in FIG. 13A. However, as this sync circuit 9' has the window center adjusting circuit, no gate delay correcting dummy gate is required so that this sync circuit 9' is constructed of, as shown in FIG. 18, two DFF and two BiCMOS inverters.

A delay line means 173 of the window center adjusting circuit 200 is used as a delay buffer by combining two invertor gates. It should be noted that since the $GC_k$ (k=1 to n) inverters at the front stage are wired with very short wiring lines, and only one load circuit is employed, it is preferably constructed by CMOS for the high speed operation. To the contrary, a wiring length from the $GB_k$ (k=1-n) inverters to the selector 174 becomes long as "n" value becomes large. Also, it is very difficult to equally set this wiring length. As a consequence, the load capacity and load resistance tend to fluctuate, and the values of the respective delay buffers have fluctuations. For the above-described reason, the $GB_k$ inverters at the post stage are constructed by the BiCMOS gates not susceptible to an adverse influence of the load capacity.

As shown in FIG. 19, the window error detecting circuit 300 includes such an arrangement that a first bit and a fifth bit of a 5-bit shift register constructed of 5-stage D-type flip flops 191 to 195 are input into an exclusive OR gate 196. The flip flop 197 has a latch function.

An operation of the preferred embodiment will now be described with reference to FIGS. 17 and 19 to 21. As previously described, the signal generating circuit 170 in FIG. 17 generates as a test signal 172 a 4T pattern (1000, 1000, - - - ) repeat signal from the reference clock (REF CLK). It is of course possible to generate other patterns than the 4T pattern. When the read gate is gated, the adjusting mode is commenced, and the changing switch 171 selects the test signal 172.

Figure 20:
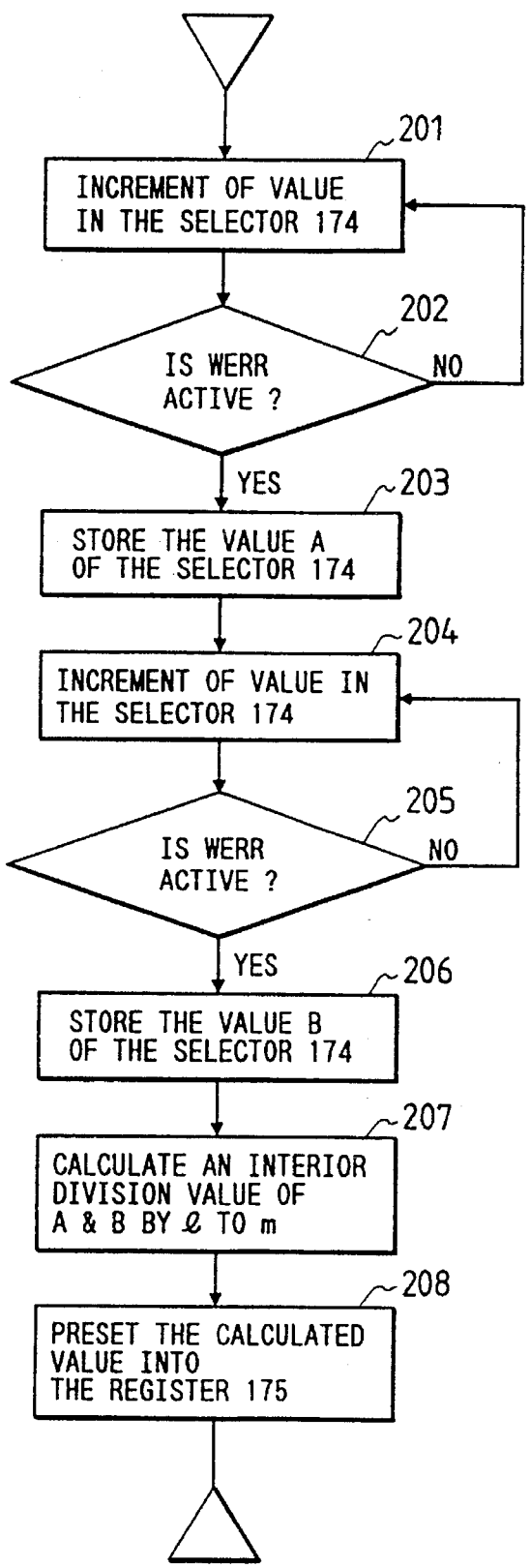
FIG. 20 is a flowchart for explaining one example of an adjusting mode program executed in the microprocessor 250 shown in FIG. 16.
Figure 22B:
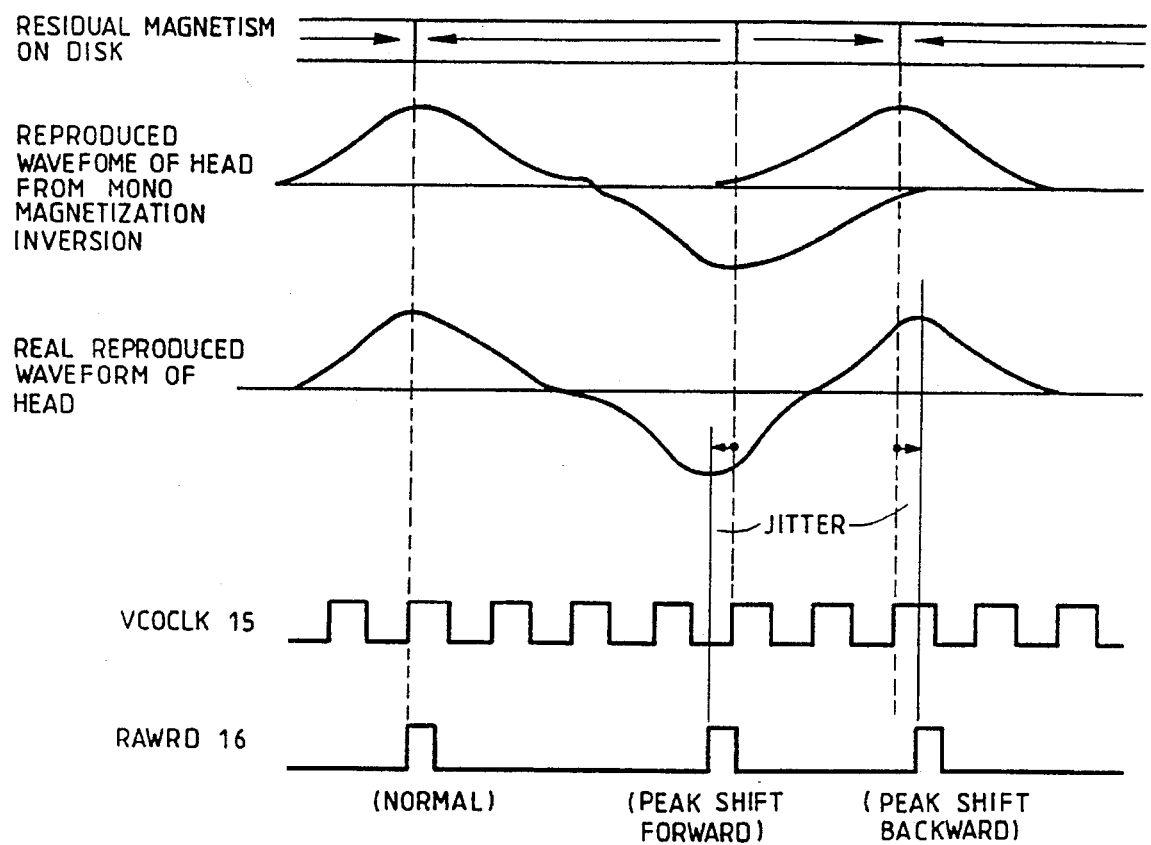

The window adjusting circuit 120 is under control of a microprocessor 250. FIG. 20 is a flowchart for explaining an operation by the microprocessor 250. When the adjusting mode is set, the value of the selector 174 shown in FIG. 17 is sequentially incremented from the minimum value thereof (step 201) so as to check whether or not WERR 164 as the output of the window error detecting circuit 300 becomes active (step 202). If the selected tap is equal to the delay amount within the window range, the first bit of the shift register of the window error detecting circuit 300 has the same value as the fifth bit. The output of the exclusive OR gate 196 becomes 0. If the delay amount is out from the window range, as shown in FIG. 21, SRD 17 is also out from the 4T pattern. Thus, the output of the exclusive OR gate 196 becomes 1. As shown in FIG. 21C, the pulse is output to WERR 164 (active). If it does not become active, an increment operation is furthermore continued. Then, when it becomes active, the selector value "A" at this instant is stored (step 203). Thereafter, the increment operation is continued (step 204), and when WERR 164 becomes active, the selector value "B" at this stage is stored (step 206). Then, a calculation on the division of l:m is carried out with the values A and B (step 207). In general, this division is 1:1. However, this division ratio may be selected by a user. The calculation result is preset in a register 175 (step 208), thus the adjusting operation (adjusting mode) is accomplished. The waveforms shown in FIGS. 21B and 21D are an SCLK 18 and a tap selecting address.

By performing the above-described adjusting operation at another mode than the data readout mode from the disk, the fluctuations of the circuit elements and the window center deviation due to the temperature drift can be automatically corrected, so that the read margin of the disk apparatus can be extended as much as possible.

It should be noted that in the above preferred embodiment, the calculation for obtaining the optimal delay amount by utilizing the division method of the tap selection address has been executed by the program of the microprocessor 250. However, it is also possible to perform the same calculation by arranging the hardware such as the adders and shift registers shown in FIG. 16.

In the above-described preferred embodiment, the encoder and decoder were (2-7) code type. Other codes, for instance, (1-7) code may be realized by employing the BiCMOS gates with the high-speed data transfer and lower power consumption.

The terminals of IC shown in FIGS. 1 to 16 will now be described. It should be noted that "IN" and "OUT" subsequent to the respective terminal names represent an input terminal and an output terminal, and also the function explanations are added to the corresponding terminal names. WRITE GATE (iN): This terminal is brought into "H" during the write operation. As a result, the writing condition becomes such that, i.e., the NRZ signal written on the disk is converted into the (2-7) code and output this code. This terminal is set to "H" in the address mark writing mode of the soft selector, and "L" in the detection mode. PHASE SYNC(iN): When this signal is set to "L" at the beginning of the reading operation, PLL starts to frequency/phase-compare the input data of 4T (1000) sink pattern at a high gain. Once the synchronization is achieved, when this signal is set to "H", PLL is brought into the phase comparison mode at the normal mode. To this terminal, the $\overline{\text{SYNCDETECT}}$ signal is connected in a normal condition.

P SEL (iN): The signal are matched to the polarities of the (2-7) code input to RAWRD and DLYRD terminals and read out from the disk

| Read data polarity | PSEL terminal |
| --- | --- |
| active H | H |
| active L | L |

$\overline{\text{VCOIN}}$ (iN): The $\overline{\text{VCOOUT}}$ terminal is connected to the terminal in question. The clock input into the terminal in question corresponds to a feedback signal of PLL 12, and is synchronized to the data read from the disk.

VCOIN(iN): The VCOOUT terminal is connected to the input terminal in question. In response to the clock input into this terminal, the clock sync circuit and decoder circuit are operated.

RAWRD (iN): This is an input terminal for the (2-7) code read from the disk, and the leading edge of the input signal is a reverse magnetization timing. PLL 12 performs the phase synchronization by utilizing this leading edge.

REF CLK (iN): A reference clock of IC according to the invention is applied. VCO 8 is synchronized with this reference clock signal other than the data read mode. Also in case of the data write mode, this reference clock is used as a write clock. A clock having a frequency two times higher than the data transfer rate is applied.

READ GATE (iN): In case of the data read mode, this terminal is set to "H", the read condition is set such that the (2-7) code read from the disk is converted into the NRZ signal and output therefrom.

In response to the READ GATE signal, the counter circuit, the clock changing of the internal circuit and the output of the $\overline{\text{NRZ}}$ signal are in enable conditions. PLL 12 starts to phase-synchronize the (2-7) code.

DLYRD (iN): When the RDSEL terminal is set to "L", the (2-7) code input from the terminal in question is input into the sync circuit 9. Since this terminal is independent from PLL, the window center shifts due to the normal phase errors of PLL 12 and the gate delay errors can be corrected by adjusting the phases with the external delay element.

RDSEL (iN): An input signal to the sync circuit is switched.

| RDSEL | Input signal to sync signal. |
| --- | --- |
| H | (2-7) code input from RAWRD terminal. |
| L | (2-7) code input from DIYRD terminal. |

$\overline{\text{RESET}}$ (iN): When the power supply is turned on, this signal is set to "L" so as to initialize the internal circuit of IC. The output clock frequency of VCO is set to a center frequency. During the normal operation, this signal is held at "H" level.

EX SYNC iN (iN): In case of 4T(1000) pattern, the output from the sync field detecting circuit 37 externally connected to output the "H"-level signal is supplied to the terminal in question (only valid in case of the soft selector externally connecting circuit mode). After detecting the "H" condition of this output during 2 Byte term, the $\overline{\text{SYNCDETECT}}$ signal becomes "L" and then becomes "H" after "L" condition is continued for a time period determined by MODESEL 0 to 2. When the $\overline{\text{SYNCDETECT}}$ signal becomes "L" and the EX SYNC iN signal becomes "L", this $\overline{\text{SYNC DETECT}}$ signal is returned to "H". MODE $\text{SEL}_O$ (iN), MODE $\text{SEL}_1$ (iN) and MODE $\text{SEL}_2$ (iN):

The operation mode of IC in question is set by three terminals MODE SEL 0-2.

| MODE SEL2 | MODE SEL1 | MODE SEL0 | Soft sector/ Hard Sector | SYNC Pattern Detection Mode | $\overline{\text{SYNCDETECT}}$ Output Term | *2 Frequency Phase Comparing Mode |
|---|---|---|---|---|---|---|
| L | L | L | Soft sector | Built-in Sync field detecting circuit | 6 Byte | 1 |
| L | L | H | Soft sector | Built-in Sync field detecting circuit | 8 Byte | 1 |
| L | H | L | Soft sector | Built-in Sync field detecting circuit | 8 Byte | 2 |
| L | H | H | Soft sector | External Sync field detecting circuit | 6 Byte | 1 |
| H | L | L | Soft sector | External Sync field detecting circuit | 8 Byte | 1 |
| H | L | H | Hard sector | *1 READ GATE | 6 Byte | 1 |
| H | H | L | Hard sector | *1 READ GATE | 8 Byte | 1 |
| H | H | H | Hard sector | *1 READ GATE | 8 Byte | 2 |

Remarks: In accordance with the DC erase method, a hard sector mode may be utilized in IC of the invention.
*1 In case of the hard sector, after the READ GATE signal is asserted, the $\overline{\text{SYNC DETECT}}$ signal becomes active in response to the tray leading edge of the first RAWRD signal.
*2 There are two frequency phase comparison modes.

Remarks: In accordance with the DC erase method, a hard sector mode may be utilized in IC of the invention.

*1 In case of the hard sector, after the READ GATE signal is asserted, the $\overline{\text{SYNC DETECT}}$ signal becomes active in response to the tray leading edge of the first RAW RD signal.

*2 There are two frequency phase comparison modes.

Mode 1: An output is derived by a phase difference between the RAW RD signal and VCOIN signal.

Mode 2: A pulse is derived by delaying the time period only by the VCO CLK half period to 1 period with the phase difference between the RAW RD signal and VCOIN signal.

AME (ADDRESS MARK ENABLE) (iN): The input terminal in question is used only in the DC erase mode, and the terminal in question is brought to "H" only when the address mark of the soft sector is written and the address mark is detected.

The DC erase is continued when the address mark is written during a time period where both the input signal to this terminal and WRITE GATE signal are "H".

When the address mark is detected, and the DC erase term is continued more than 30 REF CLK periods under the condition that the signal in question is "H" and WRITE GATE signal is "L", an AMF (ADDRESS MARK FOUND) signal is output after the DC erase. When the AMF signal is output, the disk controller disasserts the AME signal to "L".

AMSEL (iN): In accordance with the input terminal in question, the address mark generation/detection system is selected from the following two modes:

| AMSL | Address mark generation/detection method |
|---|---|
| H | DC erase |
| L | (7-2) illegal pattern |

100000001001

$\text{LCLK}_2$ (iN): This is used as a clock when the write precompensation is effected, and a clock whose phase is delayed with respect to NCLK (normal clock) is input. It should be noted this clock is further delayed with respect to $\text{LCLK}_1$ (rate clock 1). This terminal becomes a $\overline{\text{TEST}}$ pin in case of the internal gate delay mode (i.e., $\overline{\text{WRPE}}$ signal becomes "H" and TABSEL signal becomes "4" as shown in the following mode:

| $\text{LCLK}_2$ | Internal logic circuit |
|---|---|
| H | normal mode |
| L | test mode |

It should be noted that in case of the mode other than the internal gate delay mode, the internal logic circuit becomes the normal mode irrelevant to the level of the input signal to the terminal in question.

$\text{LCLK}_1$ (iH): This clock is used as a clock in case of the write precompensation, and a clock whose phase is delayed with respect to the NORMAL CLK is input. This clock is used only when the table 2 is selected.

NCLK (iN): This clock is used as a clock in case of the write precompensation, and the clock having a reference phase is input.

$\text{ECLK}_1$ (iN): This clock is used as a clock in case of the write precompensation, and the clock whose phase is led with respect to NCLK is input. However, this clock has a phase delayed with respect to the CLKOUT signal.

TABSEL (iN): Based upon the TABSEL and WRPE terminals, the data phase precompensation (WRITE PRE-COMPEPENSATION) mode during the write operation is set.

| WRPE | TABSEL | *[1] selection table | precompensation method |
|------|--------|---------------------|------------------------|
| L    | L      | 2                   | external delay line    |
| L    | H      | 1                   | external delay line    |
| H    | L      | 2                   | internal gate delay line |
| H    | H      | —                   | no phase compensation  |

*[1]: Two different tables of precompensation are present.

$\overline{\text{NRZWD}}$ (iN): The NRZ signal written on the disk is supplied to this terminal. When this signal is input, it is necessary to be synchronized with RWCLK of IC in question. This IC once inverts the input signal to this terminal into (2-7) code.

NRZRD (OUT): This terminal is an output terminal to which the (2-7) code read from the disk has been converted into the NRZ signal and the resultant signal is supplied. This signal is synchronized with the RWCLK signal.

RECLK (OUT): This is a terminal for outputting the clock in synchronization with the NRZRD signal converted during the reading operation, and another clock produced by dividing the REFCLK during the writing operation. The disk controller 11 fetches the $\overline{\text{NRZRD}}$ signal in response to this clock during the reading operation. This $\overline{\text{NRZWD}}$ signal is input in synchronization with this clock during the write operation. From the clock output from the terminal in question, the ridge produced at the clock change has been deleted.

VCOOUT (OUT): This is an output terminal for VCO 8, and is directly connected to the VCOiN terminal.

$\overline{\text{VCOOUT}}$ (OUT): This is an output terminal for VCO 8, and is directly connected to the $\overline{\text{VCOiN}}$ terminal. Although this output signal is an inverted signal of VCOOUT, and independently generated in the same circuit as the VCOOUT signal generating circuit with utilizing the symmetry of the internal VCO circuit.

SYNCRD (OUT): This is a (2-7) code latched by the VCO clock. This terminal is used as a window margin test monitoring pin when no adjustment is carried out without DLYRD. To the contrary, during the adjustment, this terminal is used as the window center adjustment monitoring pin so as to adjust the phase of DLYRD.

$\overline{\text{SYNC DETECT}}$ (OUT): soft sector mode: When a detection is made during 2 byte periods that either the output of the built-in sync field detecting circuit, or EX SYNC iN input becomes active "H" this terminal becomes "L", and becomes "It" after the term "L" set by MODE SEL$_{0-2}$ is continued.

hard sector mode:

When READ GATE becomes active "H", the terminal in question becomes "L" at the pulse timing of RAWRD, and then becomes "H" after the term "L" set by MODE SEL$_{0-2}$ is continued. It should be noted that this terminal becomes active "L" once after READ GATE is asserted in both the soft sector and hard sector modes, and thereafter is disable until the READ GATE is again asserted. In normal, this terminal is connected to the $\overline{\text{PHASE SYNC}}$ terminal.

LATED WG (OUT): This signal corresponds to a signal produced by delaying the rising edge of the WRITE GATE by 16 REFCLK periods at the beginning of the write operation. During this period, the (27) WRITE DATA output signal becomes a normal signal form.

AMF (ADDRESS MARK FOUND) (OUT): When the AME signal becomes "H" and the WRITE GATE signal is continued for more than 30 REFCLK periods in the DC erase period, and after the DC erase is accomplished, this signal becomes "H". When the AME signal becomes "L", this signal becomes "L" similarly.

(7-2) illegal mode:

When the READ GATE signal becomes "H" and the (7-2) illegal pattern (100000001001) is detected, this output terminal becomes "H". When the READ GATE signal becomes "L", this signal becomes "L". 2-7 WD (OUT): This is an output terminal for a signal which is obtained by converting the NRZ signal to be written on the disk, into the (2-7) code.

CLKOUT (OUT): This is a reference clock output when the write precompensation during the writing operation is carried out. This signal is used as an ECLK$_2$ input signal in the internal circuit of IC.

FC: This is used for properly correct an attenuation rate of loop filter. The attenuation rates for the high gain and normal gain can be separately set by utilizing this terminal.

At the high gain:

The built-in transistor connected to this terminal is saturated and this terminal is grounded.

At the normal gain:

The built-in transistor connected this terminal is cut off, and this terminal becomes the high impedance condition.

RC: This is a resistor connecting terminal for setting the charge pump output current. The gain of this charge pump is determined by this resistance value.

RT: This is a resistor connecting terminal for setting the sampling feedback gain to 1 (ideal value). This is determined by the transfer rate.

CPOUT: This is a current input/output terminal to the externally connected loop filter 7. In general, this terminal is connected to the ViN terminal and further to the externally connected loop filter.

ViN: This is a control voltage input terminal of the built-in VCO8. The oscillating frequency of VCO8 is changed by applying the voltage to this terminal.

When the $\overline{\text{RESET}}$ signal is enable, the VCO bias voltage generated in IC is applied via an analog switch to the ViN terminal, and VCO is ocillated at a center frequency. In normal, this terminal is connected to the CPOUT terminal.

RVCO: This is a resistor connecting terminal for setting the center frequency of VCO. This is determined by the transfer rate.

DVCC: This is a power supply terminal for the digital circuit.

DGND: This is a ground terminal for the digital circuit.

AVCC: This is a power supply terminal for the analog circuit.

AGND: This is a ground terminal for the analog circuit.

Figure 16:
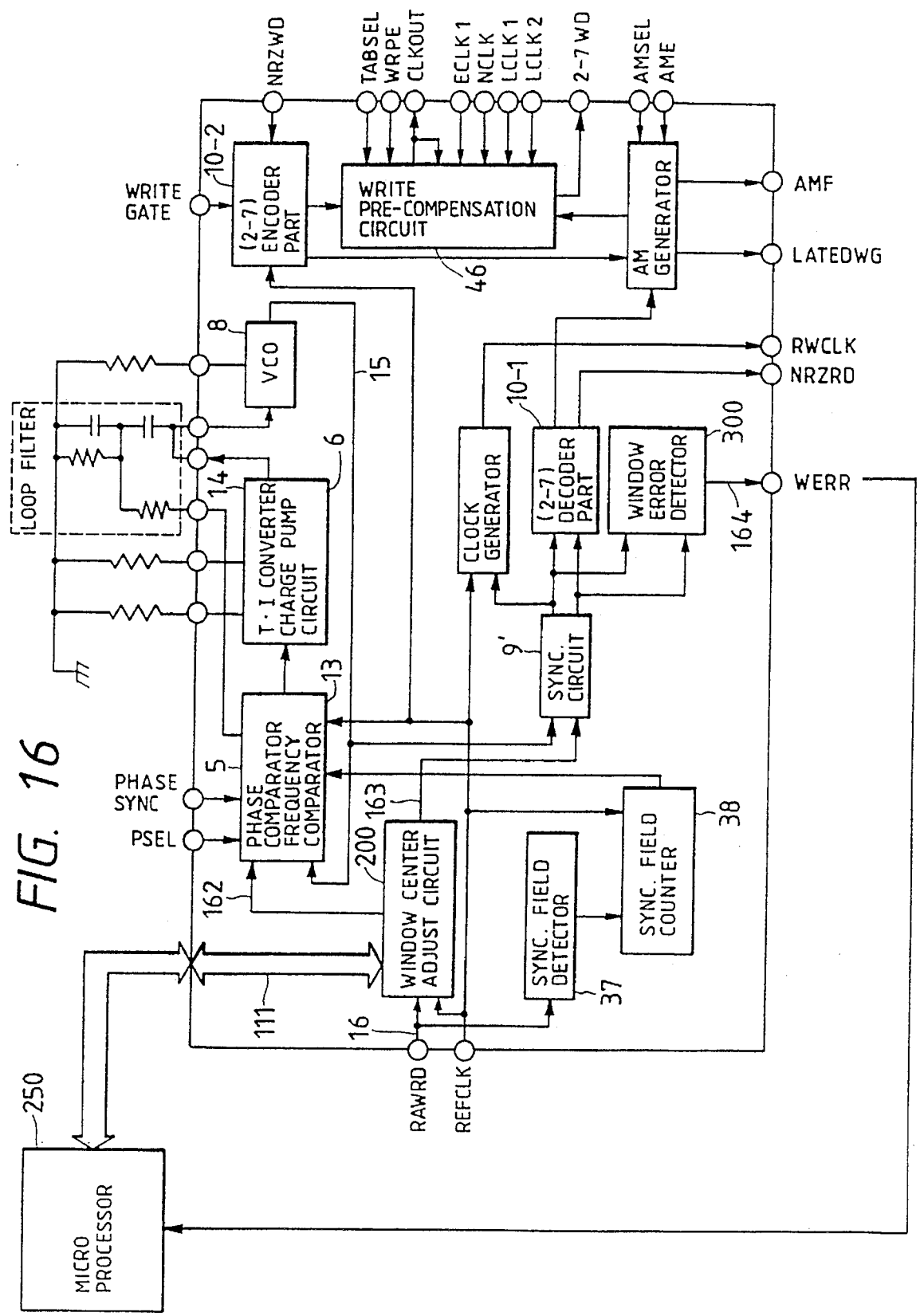
FIG. 16 is a block diagram of an encoder/decoder built-in type data separator according to a second preferred embodiment of the invention.
Figure 17:
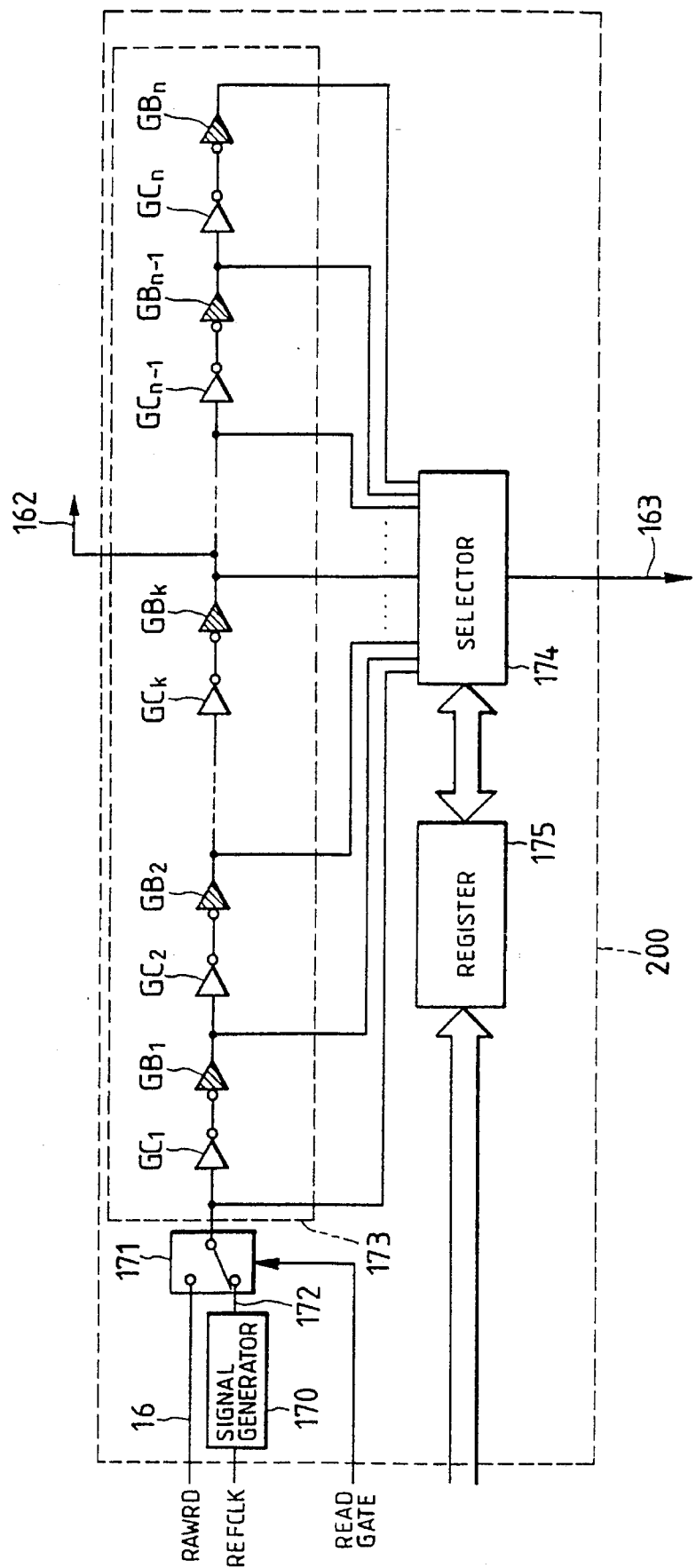
FIG. 17 is a circuit diagram of a detailed window center adjusting circuit shown in FIG. 16.

Descriptions on the terminal groups shown in FIGS. 1 and 16 are accomplished.

According to the invention, since the high-speed encoder/decoder built-in type data separator can be realized at the lower power consumption, this data separator can be fabricated as an integrated circuit, and may be sealed within a package. Therefore, the data separator according to the invention is suitable for a compact disk apparatus.

What is claimed is:

1. A disk recording apparatus wherein a second read signal is produced from a first read signal read out from a disk shaped record medium, comprising:

a data separator chip which includes:
  a signal processing meads which produces said second read signal by employing a window which has been formed based upon a clock pulse generated from said first read signal,
  window timing varying means for varying timing of said window relative to said first read signal, and
  memory means for holding control data which is used by said window timing varying means;

a microprocessing chip for setting said control data to said memory means of said data separator chip for adjusting window timing of said window relative to said first read signal; and window error detecting means for judging whether an error has occurred in said second read signal produced by said signal processing means, wherein said microprocessor chip executes varying of said control data, calculating of first data from said control data at borders of said error and setting of said first data as said control data in memory means.

2. A disk recording apparatus according to claim 1, wherein said microprocessor chip automatically executes said varying, calculating and setting when the apparatus is not performing a read operation.

3. A disk recording apparatus according to claim 1, wherein said microprocessor chip calculates said first data by obtaining a maximum and a minimum delay amount through varying and dividing each of the maximum and minimum delay amount into an arbitrary ratio.

4. A disk recording apparatus according to claim 1, further comprising:

a test signal generator for producing a test signal in place of said first read signal for detection in said window error detecting means.

5. A disk recording apparatus wherein a second read signal is produced from a first read signal read out from a disk shaped record medium, comprising:

a disk separator which includes:
phase synchronizing means, into which said first read signal is input, for generating a clock pulse in synchronism with said first read signal,
synchronizing means, into which said first read signal and said clock pulse produced from said phase synchronizing means are input, for producing said second read signal by employing a window which has been formed based upon said clock pulse,
window timing adjusting means for adjusting timing of said window relative to said first read signal based on control data, and
memory means for holding control data which is used by said window timing adjusting means;

a microprocessing chip for producing first data for adjusting timing of said window to minimize error-rate of said second read signal and setting said first data as said control data to said memory means; and window error detecting means for judging whether an error has occurred in said second read signal produced by said synchronizing means;

wherein said microprocessing chip executes:
setting of a plurality of second data for setting various timing of said window as said control data respectively in said memory means, getting of data from said window error detecting means which indicates whether an error has occurred or not in said second read signal in response to said second data respectively, calculating of first control data employing data from said window error detecting means and setting of said first data as said control data in memory means; and wherein said microprocessing chip calculates said first data by obtaining allowable maximum and minimum delay amount through setting of a plurality of second data and dividing the maximum and minimum delay amount into an arbitrary ratio.

* * * * *